June 5, 1956 G. R. STIBITZ 2,749,037
ELECTRONIC COMPUTER FOR MULTIPLICATION
Filed April 21, 1950 9 Sheets-Sheet 1

INVENTOR.
George R. Stibitz
BY
Carlson, Pitzner, Hubbard & Wolfe
ATTORNEYS

June 5, 1956 G. R. STIBITZ 2,749,037
ELECTRONIC COMPUTER FOR MULTIPLICATION
Filed April 21, 1950 9 Sheets-Sheet 2
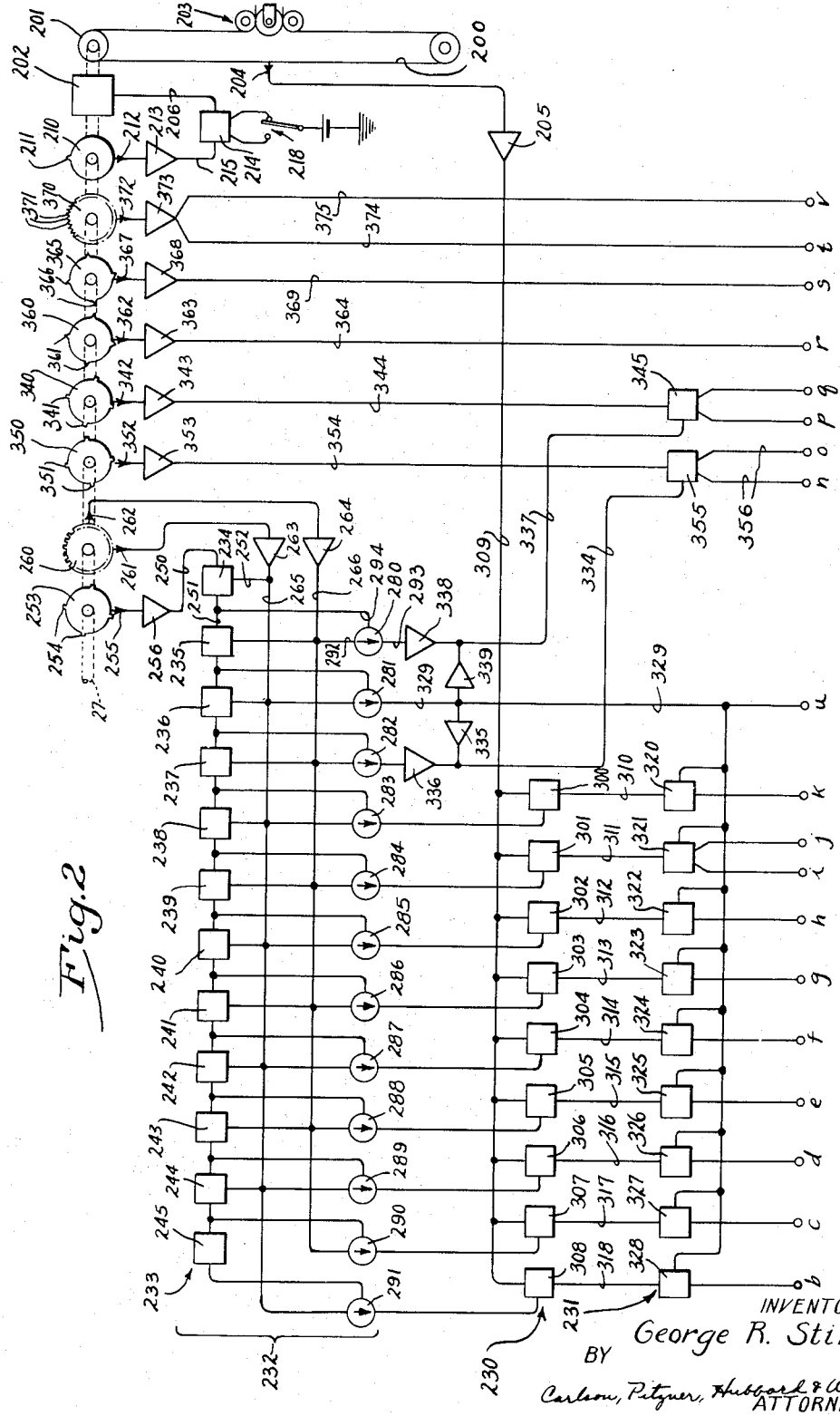
INVENTOR
George R. Stibitz
BY
Carlson, Pitzner, Hubbard & Wolfe
ATTORNEYS

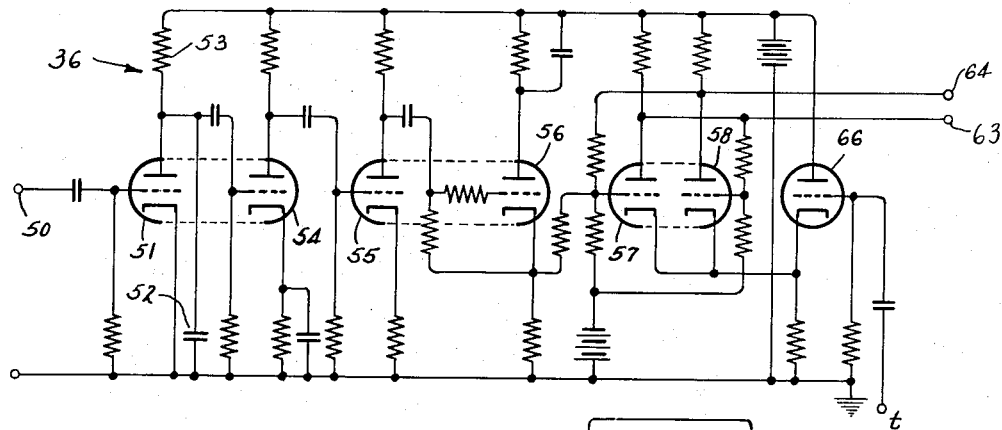
Fig. 3. PICKUP AMPLIFER and WAVE SHAPER
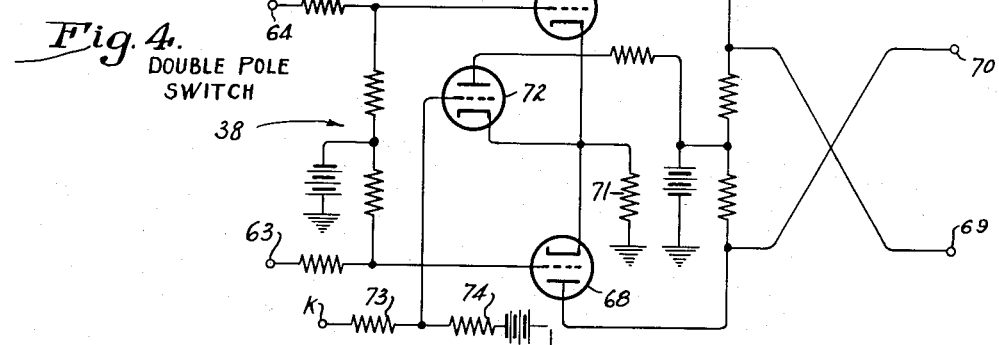
Fig. 4. DOUBLE POLE SWITCH
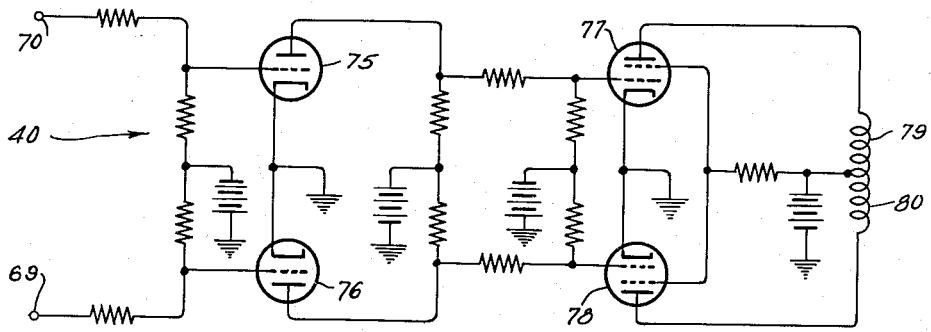
Fig. 5. RECORDING AMPLIFIER
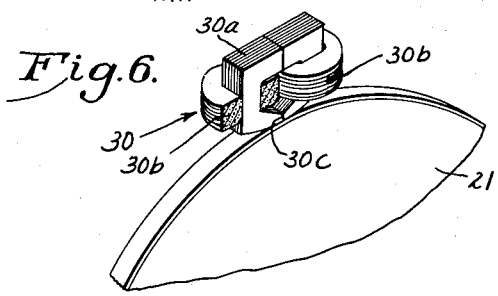
Fig. 6.
INVENTOR.
George R. Stibitz
BY
Carlson, Pitzner, Hubbard & Wolfe
ATTORNEYS June 5, 1956

G. R. STIBITZ 2,749,037

ELECTRONIC COMPUTER FOR MULTIPLICATION

Filed April 21, 1950

UNLOCKING FLIP-FLOP DEVICE

INVENTOR.
George R. Stibitz
BY

Carlson, Pitzner, Hubbard & Wolfe
ATTORNEYS

June 5, 1956 G. R. STIBITZ 2,749,037
ELECTRONIC COMPUTER FOR MULTIPLICATION
Filed April 21, 1950 9 Sheets-Sheet 5
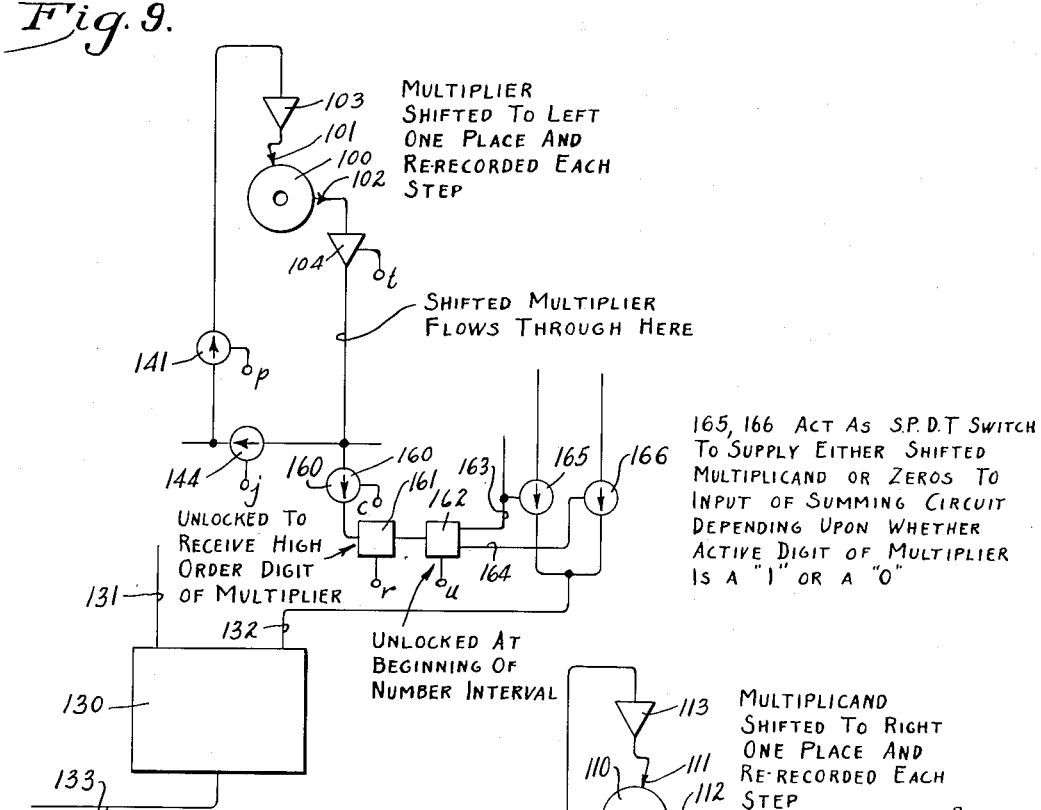
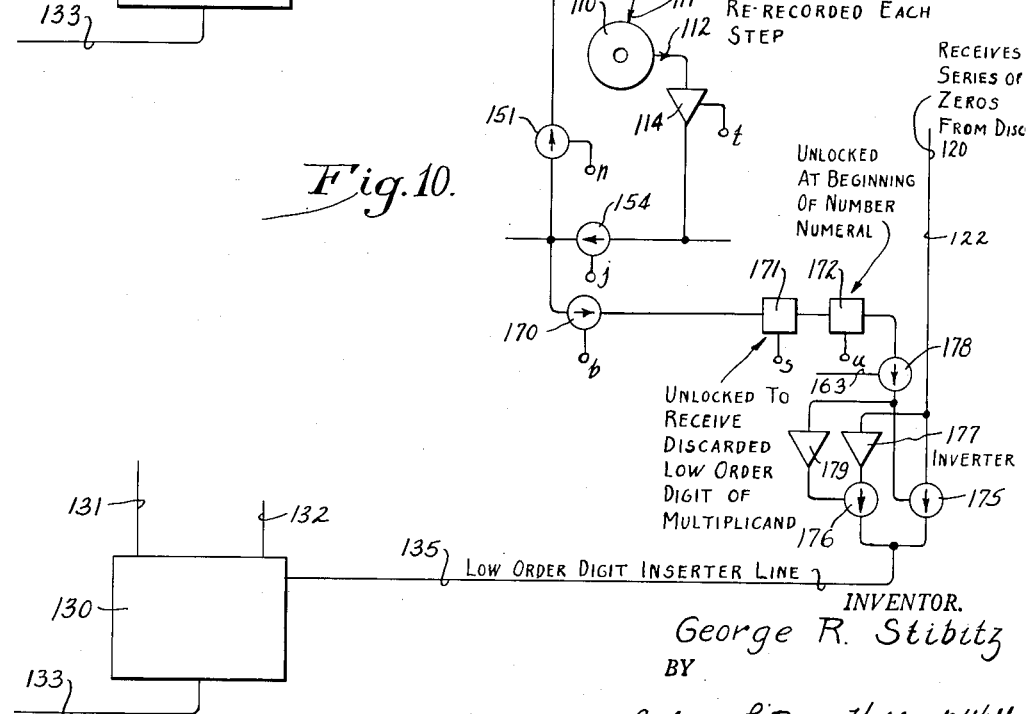
INVENTOR.
George R. Stibitz
BY
Carlson, Pitzner, Hubbard & Wolfe
ATTORNEYS

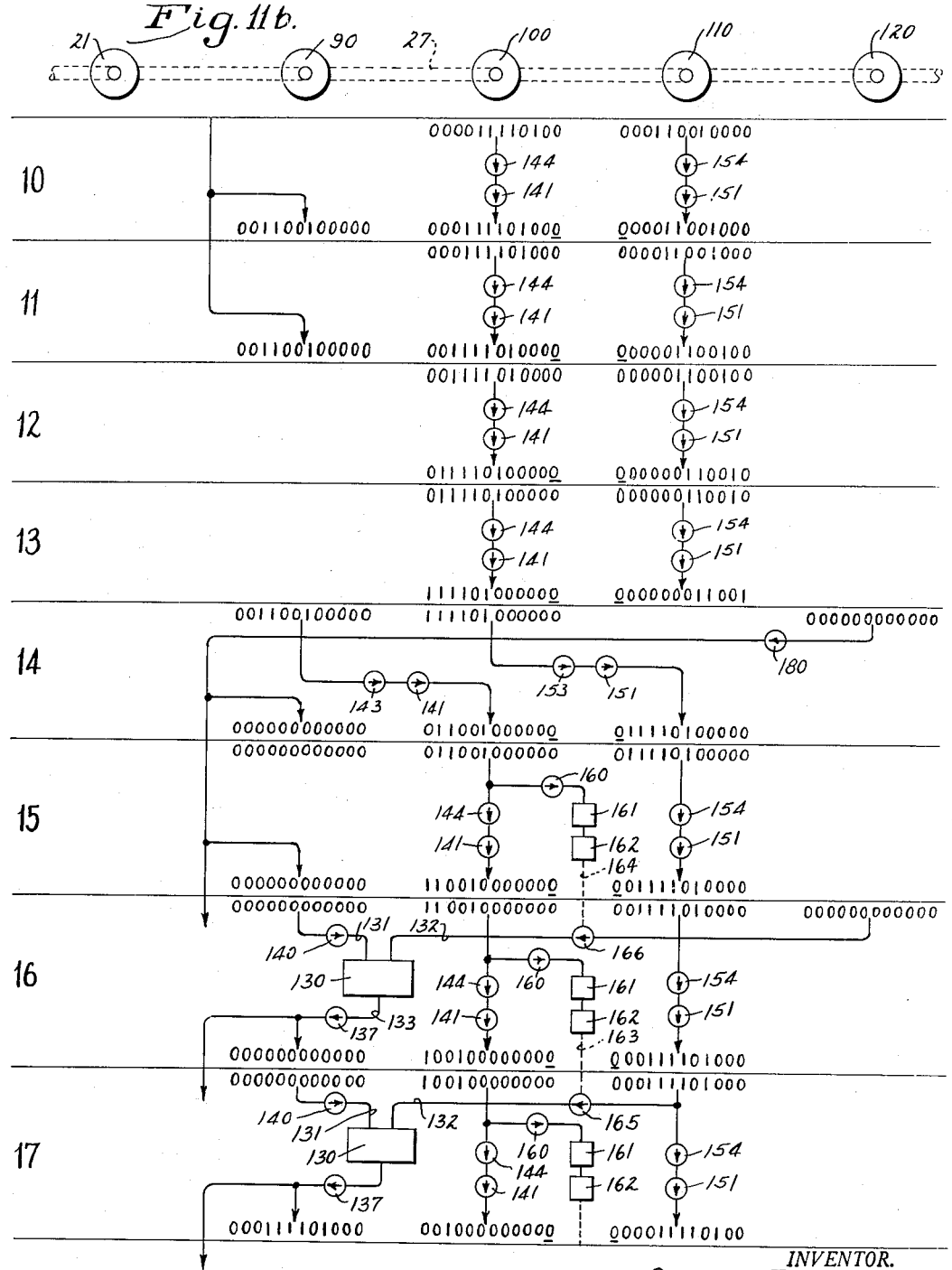

June 5, 1956
G. R. STIBITZ
2,749,037
ELECTRONIC COMPUTER FOR MULTIPLICATION
Filed April 21, 1950
9 Sheets-Sheet 8
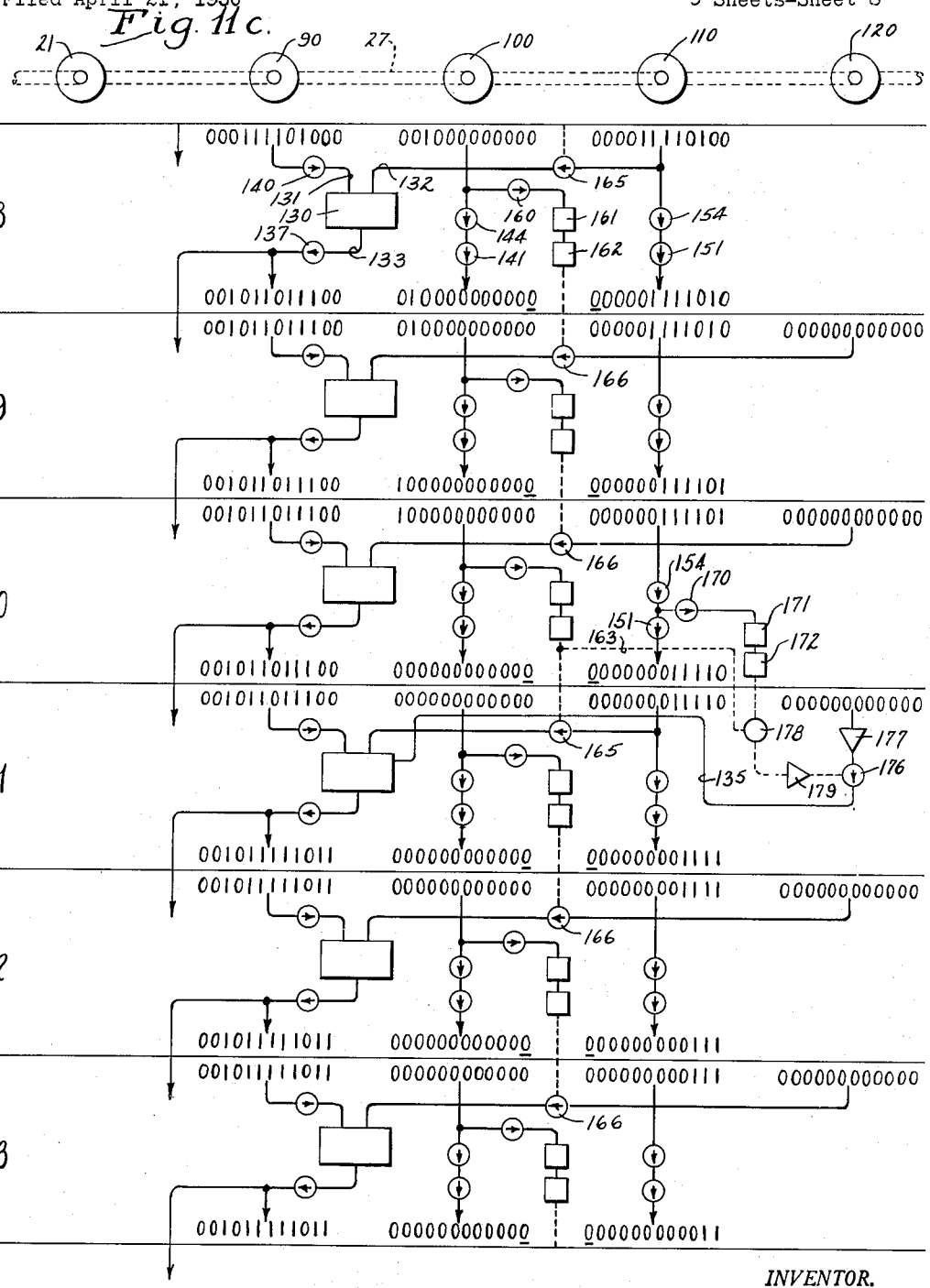
INVENTOR.
George R. Stibitz
BY
Carlson, Pitzner, Hubbard & Wolfe
ATTORNEYS June 5, 1956 G. R. STIBITZ 2,749,037
ELECTRONIC COMPUTER FOR MULTIPLICATION
Filed April 21, 1950 9 Sheets—Sheet 9
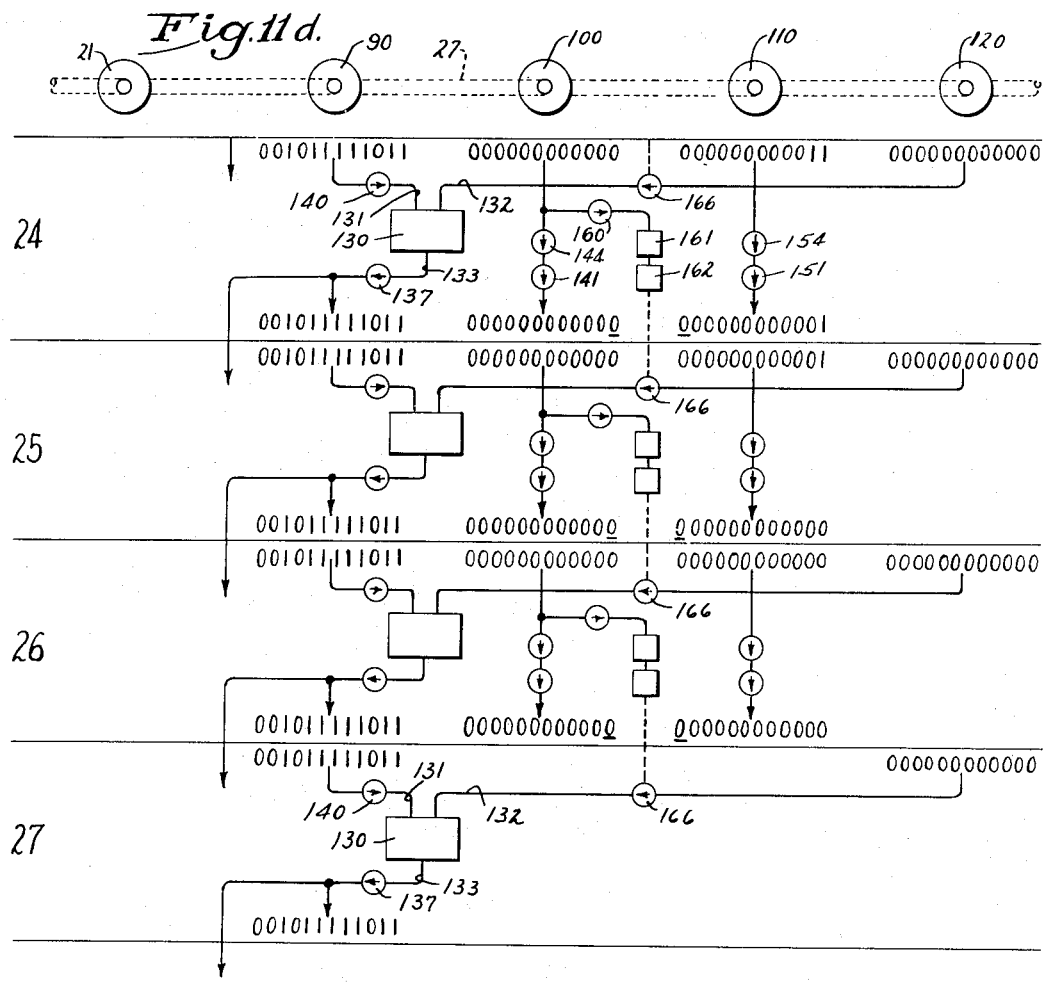
INVENTOR.
George R. Stibitz
BY
Carlson, Pitzner, Hubbard & Wolfe
ATTORNEYS United States Patent Office 2,749,037
Patented June 5, 1956

2,749,037

ELECTRONIC COMPUTER FOR MULTIPLICATION

George R. Stibitz, Burlington, Vt.

Application April 21, 1950, Serial No. 157,369

14 Claims. (Cl. 235—61)

The present invention relates to digital computers and more particularly to a device for performing the multiplication of one binary number by another.

It is an object of the present invention to provide an improved device for multiplying binary numbers accurately and at a rate of speed which is far in excess of present day commercial calculators.

It is another object of the invention to provide a novel computer of the digital type for multiplying two binary numbers together in which the steps of computation require only successive addition and shifting of a binary number relative to a number in a storage device. It is also an object to provide an improved computer of the sequential type in which the data comprising a number flows from one storage device to another during a given step of the computation and in which means synchronized with the flow of data are provided for directing the flow depending upon the value of the binary digit occupying a given digital order. More particularly it is an object to provide means for "reading" successive digits of a multiplier in successive steps of computation and to employ such data to determine whether addition or merely shifting shall occur in the following step.

It is a further object to provide in a computer capable of performing multiplication, means for reading the successive digits of the multiplier starting with the highest order to determine whether the multiplicand shall be added or merely shifted relative to the summation of the partial products. It is an object to provide novel means for rounding off the answer to a problem in multiplication which exceeds the place capacity of the computer. It is a more specific object to provide means for multiplying a successively shifted multiplicand by successive digits of a multiplier and for rounding off the multiplicand by a procedure which avoids cumulative rounding-off errors.

Still another object is to provide a computer for multiplication which is relatively simple and inexpensive to construct, which is compact, and which may be advantageously utilized as a building block in the construction of computers capable of solving all normal problems of arithmetic. It is an object to provide a computer having both electrical and mechanical components in which the majority of the mechanical components need not be constructed with extreme precision and in which the electrical components are, for the most part, of the standard type used in radio receivers.

Other objects and advantages of the invention will be made apparent upon reading of the specification and upon reference to the drawings, in which:

Figure 1 is a simplified schematic diagram of a preferred form of arithmetic unit and associated memory unit employed for multiplying numbers expressed in the binary system.

Fig. 2 discloses a control unit for supplying switch-controlling impulses to the arithmetic unit and memory unit of Fig. 1.

Fig. 3 discloses a pickup amplifier for use with the pickup head and having means for triggering to produce a square wave output.

Fig. 4 is a schematic diagram of a double pole switch employed in the present invention.

Fig. 5 is a schematic diagram of a recording amplifier.

Fig. 6 is a fragmentary view of one of the magnetic disks having a head magnetically coupled to the edge thereof.

Fig. 9 shows the portion of the computer employed for shifting the multiplier successively to the left as well as for reading the active digit to direct what occurs during the ensuing step.

Fig. 10 shows the portion of the computer employed for shifting the multiplicand successively to the right and for reading the discarded digit in order to effect rounding off of the multiplicand.

Figure 1:
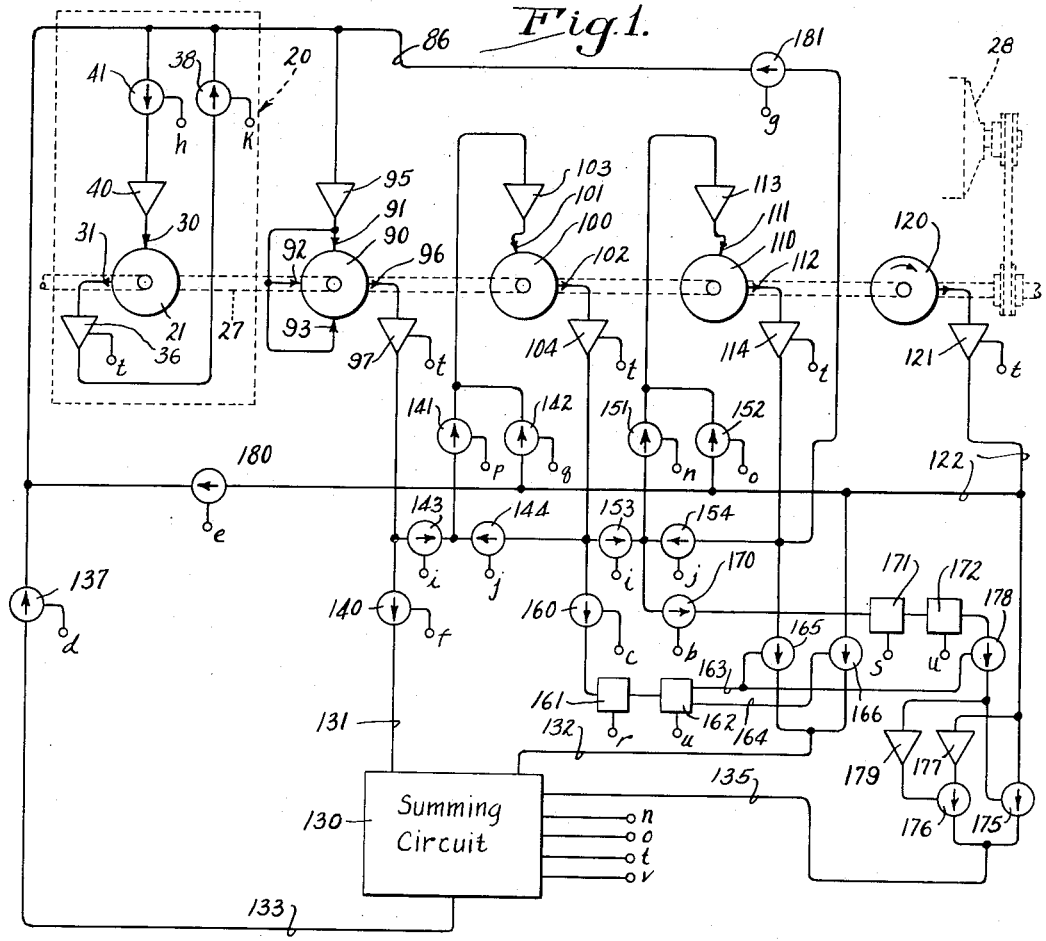

Figs. 11a–11d constitute a data flow diagram showing the performance of a typical problem in multiplication.

While the invention is susceptible of various modifications and alternative constructions and uses, I have shown in the drawings and will herein describe in detail one embodiment of the invention. It is to be understood, however, that I do not intend to limit the invention by such disclosure but aim to cover all modifications and alternative constructions and uses falling within the spirit and scope of the invention as expressed in the appended claims.

In the copending Stibitz patent applications Serial No. 34,968 filed June 24, 1948, now Patent No. 2,609,143; Serial No. 76,088 filed February 12, 1949; now Patent No. 2,701,095; and Serial No. 107,283 filed July 28, 1949, electronic computing apparatus is disclosed employing the binary system of numbers. Such computing apparatus is of the sequential type in which the number comprising the data is recorded and otherwise acted upon digit by digit progressing from the lower to the higher orders. Each of the digits is represented electrically by means of a complete voltage wave or "couple." A binary zero (0) is represented by a couple consisting preferably of a negative and then a positive pulse, while a binary one (1) is represented by a couple formed of a plus-minus pulse sequence. Representation of the digits in this fashion is accompanied by a number of important advantages which are rather thoroughly covered in the prior applications. Suffice it to say that accuracy is assured and the failure of any essential element of the computer is immediately recognized and the source of the difficulty readily traced. The same representation of the two binary digits is employed in the apparatus herein disclosed. It will be apparent to one skilled in the art that by adding to the computer a few additional components and by employing the novel scheme for division and translation as disclosed in my prior applications, it is possible to adapt the present computer to perform all normal arithmetic problems. The computer for multiplication to be discussed is well adapted for use as a building block in the construction of computers to solve the problems of almost any degree of complexity.

For purposes of convenience the computer will be arbitrarily divided into three sections which may be termed the memory unit, the arithmetic unit, and the control unit. The memory unit serves to store the raw data in the form of successive spots of magnetism paired north-south or south-north depending on which of the two binary numbers is being represented. These spots are recorded on a movable magnetic element, preferably a rotating disk. Recording and pickup heads are used in cooperation with the disk for recording the data on the disk as well as for reading it off. The various reading and recording operations are controlled by operating electronic switches associated with the recording and pickup heads. It will be assumed in the following description that raw data has previously been recorded on the disk in the memory unit from any desired source.

The arithmetic unit receives the data from the memory unit in the form of a series of voltage impulses, transforming it in a predetermined manner to produce the answer to a problem in multiplication. The procedure for preparing the data and for performing the computation is directed by a prepared set of control data in the form of couples previously recorded on a control element such as magnetic tape. Individual steps in the process are further controlled by the successive digits of the multiplier. The answer is finally recorded in the form of magnetic spots on a disk which may, if desired, be the same as that from which the problem data was previously read. During the course of solution electrical impulses in the form of electrical couples corresponding to the recorded couples of magnetism are routed through the arithmetic unit, being successively recorded on and read from rotating magnetic disks.

In the multiplication procedure a summing circuit is used to obtain the sum of the binary numbers involved in a given step of computation. Means are provided for successively shifting the multiplicand to the right relative to its final point prior to the successive addition thereof to the summation of the partial products. The multiplier is also successively shifted so that the digits of the multiplier are brought up into the active or multiplying position. Both of these shifts are obtained by offsetting the recording and pickup heads about the periphery of the magnetic disks.

The control unit, which determines the routing of the binary numbers through the summing circuit, the disks, and associated circuits, includes means synchronized with the memory disks for unlocking the switches in the arithmetic unit in proper sequence and for the proper time interval. It will be understood, however, that the unlocking sequence is not completely predeterminable but is dependent upon the condition of the data during the intermediate steps in the solution of the problem.

MEMORY UNIT

The memory unit used for storage purposes in the present computer is indicated at 20 in Fig. 1. It includes a rotating disk 21 having a periphery on which the data is stored in the form of successive spots of magnetism comprising north-south and south-north couples. This disk is rotatably driven by means of a shaft 27 powered by a driving motor 28 which rotates at a nearly constant speed which may be on the order of 1800 R. P. M. Cooperating with the periphery of the disk 21 is a recording head 30 which serves to magnetize the disk in response to variations in the exciting current. Spaced around the periphery from the recording head 30 is a pickup head 31 which produces a voltage wave with polarity corresponding to the magnetic spots on the disk. With regard to the disk and cooperating heads, reference is made to Fig. 6 where it will be noted that the head 30 on the disk has a core structure 30a and a pair of coils 30b, the magnetism being concentrated in a narrow air gap 30c along successive elements of the disk periphery. When the head is used for pickup purposes the coils are arranged in series for greater sensitivity. However, when the head is used for recording purposes, the coils are separately and oppositely energized. More detailed discussion of this portion of the apparatus is to be found in my copending application Serial No. 34,968 filed June 24, 1948. The output of the pickup head 31 is fed through an amplifier 36 and thence into an electronic switch 38 which allows the data to pass when appropriately controlled or energized by a terminal k from the control unit. As will later appear the lettered control terminals of Fig. 1 are in each case connected to correspondingly lettered terminals in Fig. 2. Information is recorded on disk 21 whenever necessary through a recording amplifier 40 and a recording switch 41.

The pickup amplifier 36, the switches 38 and 41, and the recording amplifier 40 are typical of similar units throughout the arithmetic unit. It will therefore be helpful to refer briefly to the specific circuits which have been used in the preferred embodiment. By way of reservation, however, it should be noted that Fig. 1 is in greatly simplified block form with a single lead to show the path of data flow. In the actual circuit twin channels are used, the circuits associated therewith being connected back-to-back analogously to the well known push-pull amplifier circuit.

Referring to Fig. 3 which discloses the pickup amplifier and wave shaper 36, the left-hand input terminal 50 is connected to receive an input signal at a low level from the pickup head 31. As the magnetized spots on the disk 21 are moved past the air gap in the head 31, the flux set up in the magnetic circuit thereof produces a voltage in the pickup coil which is proportional to the rate of change of flux. After amplification by a triode 51, this voltage is integrated by a capacitor 52 and a resistor 53, the voltage across the capacitor being then proportional to the flux. This voltage is further amplified by triodes 54, 55, 56 and applied to the grid of the following stage. This stage consists of a flip-flop circuit having triodes 57, 58. The output leads are connected to the plates of triodes 57, 58 so that the amplified signals appearing at the output terminals 63, 64 are oppositely phased.

The flip-flop circuit including the triodes 57, 58 remains in one of two stable conditions except when a positive "unlocking" pulse is applied. This unlocking pulse is received through the pulse terminal t from the control unit. Between the terminal t and the flip-flop circuit is interposed a cathode follower 66 so that whenever an unlocking pulse is received at the unlocking terminal t, both of the tubes in the flip-flop circuit are cut off and become non-conducting. When the unlocking pulse is removed, the flip-flop stage assumes a condition which is dependent upon the then-existing condition of the voltage at the input. As will later appear, the flip-flop stage receives an unlocking pulse once for each magnetized spot on the disk, so that the output of the pickup amplifier at terminals 63, 64 is a full square wave of voltage for each binary digit (as shown) rather than a sine wave.

Attention may next be given to the circuit of the switch 38 (Fig. 4) which has input terminals 63, 64 connected to the correspondingly numbered terminals at the output of the pickup amplifier. This switch includes triodes 67, 68 having plate terminals 69, 70 respectively. The grids of the triodes are controlled by the input terminals while the cathodes are jointly connected to ground through resistor 71. Also connected to ground through common resistor 71 is a triode 72 which has its grid connected to the control terminal k through resistor 73. When a relatively low positive control voltage is supplied to the terminal k, the voltage divider, made up of resistors 73 and 74, applies a negative voltage to the grid of the triode 72 causing it to be cut off. The bias voltage developed across resistor 71 will then be relatively low and under these conditions the triodes 67, 68 will be in a state which permits conduction when directed by the input terminals 63, 64. It will be apparent that the voltage at the input terminals will be reflected as corresponding voltages at the output terminals and the switch may be considered as turned "on." There will, of course, be a phase inversion in the switch but this is taken care of by the simple expedient of transposing the output terminals 69, 70 as shown. When the voltage applied to the terminal k is highly positive the triode 72 becomes heavily conducting, raising the voltage drop across resistor 71 which in turn biases tubes 67, 68 to cut-off. Changes at the input are no longer reflected as changes at the output and the switch may then be considered to be turned "off." Under the "off" condition a relatively high "steady state" voltage appears at the output.

To insure that information is recorded on the disk 21 at a reliable level, two stages of amplification are used in the recording amplifier 40, the diagram of which is set forth in Fig. 5. The input terminals 69, 70 are connected to terminals on the switch 41 and feed into the grids of tubes 75, 76. The latter in turn drive the tubes 77, 78 which are connected to respective portions 79, 80 of the recording coil. These portions are wound in such a direction on the recording head that energization of one of them produces magnetism of one polarity while energization of the other produces magnetism of the opposite polarity. Since a double channel is used throughout as exemplified by the circuits of Figs. 3, 4 and 5 just discussed, the recording head will be dead in the absence of an input signal from the signal source. More specifically, if the switch 41 is set to the "off" condition by the control voltage applies to terminal $h$ thereon, tubes 67, and 68 will be cut off as explained earlier. This results in relatively high positive voltage on the leads 69, 70, causing both of the tubes 75, 76 to conduct. Conduction in these tubes lowers the voltage applied to the grids of the tubes 77, 78 and causes both of these tubes to be cut off. Thus, no current flows through the coils 79, 80 and no demagnetizing force is exerted by the recording head.

It will be apparent to one skilled in the art that additional storage or memory units similar to unit 20 may be connected to the bus 86 in exactly the same manner as shown in Fig. 1. For the sake of simplicity, however, only one memory unit will be sufficient to understand the operation of the circuit and to solve a typical problem.

ARITHMETIC UNIT

The arithmetic unit occupies the remainder of Fig. 1. This units is fed data in the form of voltage couples from the memory unit 20 via the line 86 and is arranged to add binary numbers as well as to shift them relative to the binal point to produce an answer which is the product of two binary numbers applied, successively if desired, to the input terminals. Operation takes place in successive steps, the routing being determined by the setting up of the switches located throughout the circuit in various combinations. Both the control unit for controlling the operation of such switches and the mathematical justification for the various operations employed to produce the answer to a problem of multiplication will be covered in subsequent sections.

It will be useful at the outset to describe the arithmetic unit purely from the standpoint of the physical components which it includes. In the present embodiment four magnetic disks are used all of these being rigidly mounted on the rotating shaft 27. The first disk 90 is used for temporary storage of data between successive mathematical steps. In order to make the data recorded on the disk 90 available for reading during a selected later step, this disk has a plurality of recording heads 91, 92, 93 spaced at 90 degree intervals and all fed by a recording amplifier 95. The latter is substantially the same as the recording amplifier 40 previously discussed. A single pickup head 96 is used connected to a pickup amplifier 97.

In discussing the disks it will be assumed that a single binary number is recorded in each of the quadrants of the disk and it will further be assumed that each number is 12 binary digits in length. It will be convenient in referring to the disks to speak of them as having four "number spaces" about the periphery, each number space made up of 12 "digit spaces". The term "number interval" will be used to designate the time required for the disk to rotate through one number space and the term "digit interval" will be used to designate the shorter space of time required for rotation through one digit space.

Shifting of a binary number one space to the left, equivalent to multiplication by decimal 2 is accomplished by the multiplier disk 100. The recording head 101 thereon is retarded or backed-off one digit space relative to the pickup head 102. Similarly to the previous stage, the disk 100 has a recording amplifier 103 and a pickup amplifier 104 associated therewith.

The next disk rigidly coupled to the shaft 27 is the multiplicand disk 110. This disk may be termed a dividing disk since it is employed to shift a binary number to the right one space relative to the binal point, in other words to divide it by decimal 2. To this end the recording head 111 is advanced about the periphery one digit space in the direction of the pickup head 112. As above, recording and pickup amplifiers are used and are designated 113, 114 respectively.

The remaining disk shown in Fig. 1 is a zero generating disk 120. This disk is permanently magnetized with a series of magnetic couples representative of binary zeros, or, if desired, may include magnetized teeth. This disk has a pickup amplifier 121 in its output circuit. The zero signal passes out over a zero bus 122.

Various switches are provided for controlling the flow of data to and from the disks, and between the disks and summing circuit 130.

Figure 7:
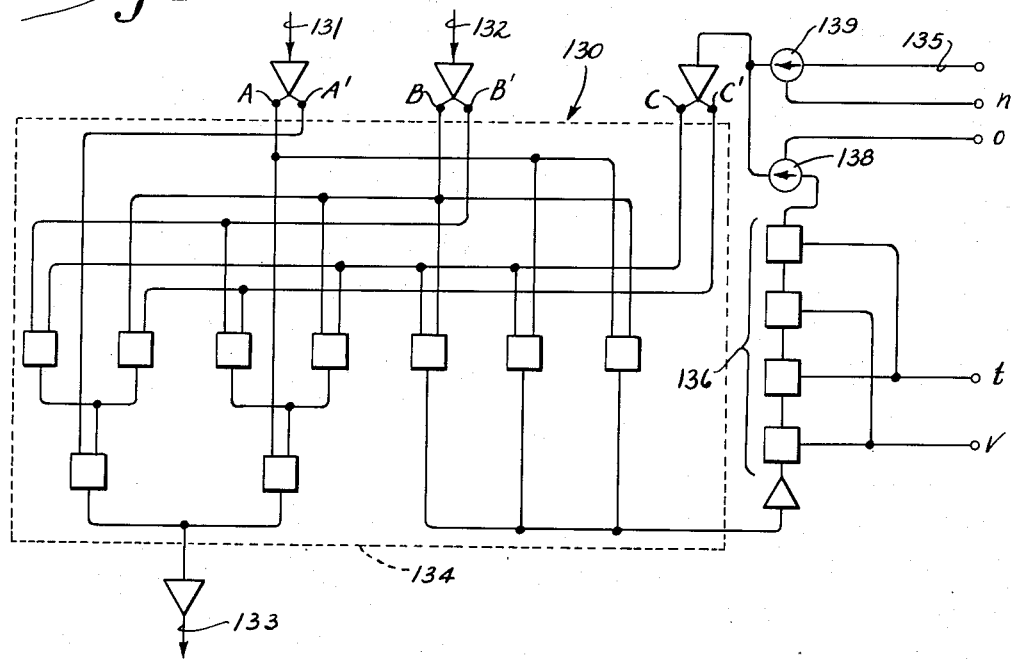
Fig. 7 is a block diagram of the summing circuit in Fig. 1.

Turning now to the summing circuit 130 in the arithmetic unit, the block diagram thereof will be found in Fig. 7. This circuit is the same as that disclosed in Fig. 10 of my copending application Serial No. 76,088 and is presented herewith merely for ready reference. The circuit includes a digit adder 134 included within the dotted outline, a carry delay chain 136 and switches 138, 139 used for low order digit insertion. The digit adder 134 is essentially the same as that disclosed in Fig. 11 of my copending application Serial No. 34,968 which was filed June 24, 1948, the input terminals being designated A, B, C, and A' B' C', to correspond thereto. These terminals carry the respective direct and inverted signals, inversion being accomplished by any desired phase-inverting amplifier. Conventional amplifiers are indicated by the triangles and may be employed where necessary to insure that the signal is at a reliable level.

With regard to the operation of the digit adder it will suffice to say that voltage couples representative of the binary digits are simultaneously applied to input terminals 131, 132. The sum of the two numbers appears at the output lead 133. Since the summation is effected order by order starting with the digit of lowest order the digits comprising the sum flow from the output in synchronism with the flow of numbers into the input. Any carry digit resulting from such summation is fed into the carry delay chain 136 and is appropriately delayed one digit interval until the instant that the digit adder is ready to sum up the digits of the next higher order. The delay is effected by alternate unlocking of the flip-flop devices in the carry delay chain at quarter digit intervals, the alternate unlocking pulses being received through the control leads $t$, $v$. For the purpose of inserting a digit in the summation of the digits of lowest order, 0's are fed through an inserter lead 135 from the zero generator disk 120. To insure that the carry digit is 0 during the adding of the lowest order, means are provided for turning the switch 138 off and the switch 139 on during the low order digit interval. This is accomplished by unlocking pulses received at terminals $n$, $o$ connected to the switches and controlled by the correspondingly numbered terminals in the control unit. As will later be pointed out in detail the line 135 serves the additional purpose of carrying binary 1's as required in the lowest order for rounding off a binary number to keep it within the capacity of the apparatus.

The output terminal of the arithmetic unit 133 is connected to a switch 137 which is turned on to record the sum on disk 90. During the normal operation of the computer the sum is fed back through the summing circuit and a second number added thereto to form a new sum which is recorded on disk 90. For convenience, therefore, the summing circuit and the storage disk together with their auxiliary components and wiring may be referred to as a totalizer.

As to the remaining switches it will be seen that the input lead 131 to the summing circuit is controlled by a switch 140. The input to the disk 100 is under the control of the switch 141 and 0's may be recorded on the disk from the bus 122 through the switch 142. The input to the switch 141 may be obtained from two sources through switches 143, 144 respectively. Switches are similarly supplied for the disk 110 and designated 151, 152, 153, 154 respectively.

As will become clear as the discussion proceeds, means are provided for reading the highest order digit of the multiplier in performing a process of multiplication. This is effected through a switch 160 supplied by the disk 100 and feeding into a digit reading flip-flop device 161 and a second flip-flop device 162. These devices, which may be referred to more generally as two-condition devices are preferably of the type discussed in my prior applications and shown in Fig. 8. It will suffice to say that they include two triodes 167, 168 with diagonally coupled plates and control grids. The cathodes are connected together to a common control lead 169 which serves to unlock the circuit so that the output may correspond in polarity with the input.

Under normal conditions one of the triodes 167, 168 conducts heavily while the companion tube is rendered non-conductive, the diagonal connection applying high negative potential to the grid. This condition will persist regardless of changes in the potential at the input lead. However, the circuit may be unlocked by momentarily stopping conduction in both of the tubes by applying a positive pulse to the cathodes. Upon removing the pulse one of the tubes will start to conduct depending upon the polarity of the input while the circuit was in the unlocked condition.

Referring again to Figure 1, the flip-flop device 162 in addition to a direct output lead 163 has an inverted output lead 164. The direct and inverted output leads are respectively connected to control the switches 165, 166. When switch 165 is "on" data can flow from the dividing disk 110 into the input lead 132 of the summing circuit. When switch 165 is "off" and 166 "on" couples representative of 0's are supplied from the zero bus 122 to the lead 132 of the summing circuit.

For the purpose of rounding off a number, the lowest digit of which is discarded, it is desirable to determine whether the discarded digit is a binary 1 or a binary 0. For this purpose a switch 170 is connected to the output of switch 154 and arranged to be closed whenever it is desired to round off the number being read from disk 110. The output of the switch 170 is connected to a flip-flop device 171 which is similar to flip-flop 161. Flip-flop 171 is unlocked by pulse on lead S during the first digit interval of a number interval, and in this way serves to store the low order digit of the number read from disk 110. The information stored in flip-flop 171 is fed to the remainder of the circuit through a second flip-flop device 172. The latter, similar to the flip-flop device 162, serves to delay the information until the succeeding number interval. One of the output terminals of flip-flop 172 is connected through switch 178 to control switches 175, 176 interposed between the zero bus 122 and the zero inserter lead 135 in the summing circuit. The switch 176 has associated therewith an inverter 177 which may be of conventional design as determined by one skilled in the art or as set forth in my prior patent applications. Since switches 175, 176 feed into a common line they must be controlled oppositely. Therefore an inverter 179 is added in series with the control line for switch 176.

When the switch 175 is closed it will be apparent that 0's will flow through the zero inserter line 135. However, when the switch 176 is closed a series of binary 1's will flow through such line, the switch 139 in the summing circuit being open only during the low order digit interval to add a binary 1 for the purpose of rounding off the multiplicand. The latter will be covered in greater detail when the rounding off portion is discussed. Under conditions in which the multiplicand is not added during the multiplying process but is merely shifted, it is undesirable to perform the rounding off. Consequently, a switch 178 is used which is turned "on" only when the multiplicand is added and turned off when the multiplicand is merely shifted. When this switch is in the "off" condition a voltage is applied to the input of the reading flip-flop device 171 so that when it is unlocked the circuit will flip into the condition which causes closure of the switch 175 and the turning off of switch 176 so that a binary 0 rather than a binary 1 is added in the lowest order.

To complete the discussion of Fig. 1, a switch 180 is connected between the zero bus 122 and the input bus 86 so that 0's may be recorded on disk 90 as desired. Furthermore, a switch 181 is interposed between the amplifier 114 and the bus 86 in order to transfer a number from the disk 110 back onto the disk 90 after accomplishing initial shifting of the binal point.

CONTROL UNIT

As was stated in connection with Fig. 1, the process of multiplication takes place in a series of steps and for each one of these steps data must be routed in a predetermined manner following selected paths in the arithmetic unit. Each step thus requires the applicable switches to be preset at the instant that the step begins and, in general, to remain set until the beginning of the next step, at which time a different combination of switch settings is required. This is one of the primary functions of the control unit which is set forth in block form in Fig. 2.

The control unit includes a series of control disks which are mounted for rotation with the shaft 27, this shaft being an extension of that shown in Fig. 1. This shaft also serves to drive a member which carries stored program or control data for setting the various switches in the arithmetic unit. Preferably, such data is stored magnetically along a tape 200. The latter is driven through a driving wheel 201 which is coupled to the shaft 27 by means of a clutch 202. This is to enable the tape to be stopped and started at will in synchronism with the feeding of problem data into the arithmetic unit. Preferably the tape 200 includes the data in the form of magnetic spots arranged in the form of north-south and south-north magnetic couples just as on the periphery of the data disks of Fig. 1. To compensate for different lengths of control tape which might be required for different programs of calculation, the tape is passed over a take-up mechanism 203. Control impulses are read from the tape by means of the pickup head 204 and associated amplifier 205. The latter may be of conventional type, producing a sinusoidal output which corresponds to the variations in flux along the tape.

Prior to discussing the main portion of the control unit, it will be helpful to refer briefly to the means here used for controlling the clutch 202. This clutch is a so-called "B" clutch which is energized upon application of voltage to an input lead 206. The clutch itself is discussed in detail in U. S. Letters Patent No. 2,013,649, dated September 10, 1935. Since the shaft 27 normally rotates at a speed on the order of 1800 R. P. M., it is of course necessary that the clutch be both rapid and positive in engagement, and it is further desirable for foolproof operation that the clutch be energized at a predetermined phasing relative to the positioning of shaft 27. This is accomplished in the present instance by means of a clutch control disk 210 having a single magnetic discontinuity in the form of a gear tooth 211. The latter sweeps past the pickup head 212 once per revolution, changing the reluctance of the pickup head and producing a voltage impulse which is amplified by appropriate amplifier 213. The pickup head 212, as well as the remaining pickup heads used in conjunction with the toothed wheels in the control unit is similar to that shown in Fig. 6 except that it is magnetized by an auxiliary permanent magnet to provide a steady state flux which changes upon arrival of a tooth. The amplifier 213 may, if desired, include conventional means for peaking the output.

The signal from the amplifier 213 serves to unlock a flip-flop device 214 having an unlocking lead 215 and an output lead for feeding into the clutch control lead 206. The flip-flop device may be the same as that disclosed in Fig. 8, except that two input leads are used with the additional input lead being connected to the grid of the second tube. A manual switch 218 in the input circuit enables a positive voltage to be applied to either of the input leads. In operation, throwing the switch to the "on" position will of itself have no effect until the flip-flop circuit is unlocked by a pulse from the disk 210.

As disclosed in my copending application Serial No. 76,088, two series of "layers" of flip-flop devices are provided for setting the switches in the arithmetic unit. These include a first series 230 of "conditioning" flip-flop circuits which are set, one by one, in predetermined conditions of equilibrium during one step of computation, and a second series 231 set by the first series simultaneously at the beginning of the succeeding step. The means here employed for setting the switches of the first series one after another, may be referred to as a successive unlocking device 232, since it unlocks the flip-flop circuits in the first series so that each of the latter is responsive at the instant of arrival of a corresponding point on the control tape 200.

The preferred unlocking arrangement employs a delay chain 233 which includes a series of flip-flop circuits 234—245. Taking the first flip-flop device 234 as representative, it will be noted that it includes an input lead 250, an output lead 251, and an unlocking lead 252. The specific circuit corresponds to that shown in Fig. 8 previously discussed except that only one output lead need be used. Prior to the beginning of a step of computation, the flip-flop device 234 receives a voltage pulse from an initiating pulse disk 253 having teeth 254 thereon which are spaced at intervals corresponding to one number space. Since there are four number spaces per revolution, four teeth are used. Passage of the teeth 254 adjacent the head 255 give rise to voltage couples which are amplified in the amplifier 256. The flip-flop device 234 will not, however, respond to the pulse from the amplifier 256 unless it is first unlocked by applying the positive pulse to the unlocking lead 252.

Let us next see how the unlocking pulses are derived for unlocking the flip-flop device 234 and the subsequent flip-flop devices in the delay chain. These unlocking pulses are obtained from an unlocking disk 260 having teeth thereon which are spaced at two-digit intervals. Each of the pickup heads 261, 262 associated therewith produces an unpeaked voltage impulse whenever a tooth sweeps past. The two heads are located about the periphery at such spacing that voltage pulses are generated alternately therein. Peaking amplifiers 263, 264 are connected to the respective heads. The practical design of such amplifiers is well within the capabilities of one skilled in the art. In a preferred embodiment, the amplifiers contain circuits for squaring the unpeaked voltage pulses generated in the pickup head and then differentiating these squared voltages to obtain sharp peaks. The negative peaks are then removed to leave only positive peaks spaced two digit spaces apart. For a discussion of wave shaping circuits see "Basic Course in Electronics," published by the U. S. Naval Institute, 1948, chapter XIX at page 207. Positive pulses are thus applied to output leads 265, 266 alternately at the beginning of alternate digit intervals.

The passage of a pulse step by step down the delay chain will be made clear by considering the normal operating sequence. As the first flip-flop device 234 receives an initiating pulse from the disk 253, it is unlocked so that the output lead 251 thereof assumes a condition corresponding to that of the input lead 250. One digit space later, the next flip-flop device 235 is unlocked, allowing it to respond to the then reversed output voltage of the first flip-flop device 234. One digit interval after that, the flip-flop device 236 is unlocked and it responds to the then existing output voltage of the flip-flop device 235 immediately ahead of it. At the same time, the flip-flop device 234 is unlocked. Since the tooth 254 is now past the pickup coil 255, the voltage on lead 250 will have returned to normal, and flip-flop device 234 will upon such unlocking change back to its normal condition. In this way each of the flip-flop devices in the delay 233 produces a voltage pulse at its output which is two digit intervals in length and spaced from the pulse generated by the preceding flip-flop device by one digit interval.

As stated above, the pulses, spaced in time, obtained from the delay chain are used to sequentially unlock the series of conditioning flip-flop devices 230. However, since the duration of the pulses obtained from the delay chain is too long, on the order of two digit intervals, means are provided for "narrowing down" the time interval over which the conditioning flip-flop devices are unlocked. The latter is accomplished by means of a series of switches 280—291.

Taking the switch 280 as representative, it includes an input lead 292, an output lead 293, and a control lead 294. The circuit of each of the switches corresponds in basic design to that previously discussed in connection with Fig. 4 except that only one input lead and the corresponding output lead are utilized. In addition, an inverter of conventional design is included in the switch. While it is true that each of the switches receives an input pulse many times during a single step of computation or number interval, such pulses will only appear at the output when the switch is "on." The latter condition occurs only once during each step. The delay chain 233 and the associated switches thus cooperate to produce accurately timed pulses which unlock the conditioning flip-flop devices 230 in synchronization with the switch-setting data flowing from the control tape 200.

As will later appear, it is desirable that certain switches in the arithmetic unit (Fig. 1) and control unit (Fig. 2) operate just prior to the beginning of a step of computation. It is necessary, therefore, to advance disk 253 slightly with respect to the shaft 27. This should be an amount sufficient so that the output pulse from the switch 280 appears one digit interval ahead of a step of computation, with the output pulse from the switch 281 signalizing the beginning of a step of computation. The pulse from switch 280 may be referred to as the "minus one pulse" while that from switch 281 is referred to as the "number pulse" since it marks the beginning of a number.

Associated with the switches 283—291 are individual "conditioning" flip-flop devices comprising a first series and designated 300—308 respectively. All of the latter, it will be noted, are simultaneously energized on the input side by a line 309 coming from the pickup head 204 of the control tape. They cannot, however, all respond simultaneously to the voltage impulses on the line 309 since they are unlocked only one at a time in sequence by the switches.

Each of the devices 300—308 may be considered to have a control space reserved for it on the tape 200, the tape being so phased that such space passes the head 204 just as the corresponding flip-flop device is unlocked. Since the tapes and disks are mechanically coupled, a high order of accuracy may be achieved. By the end of one step of computation each of the flip-flop devices in layer 230 has been "set up," in other words, energized by the control tape to assume the condition suitable for the next computation step. As a result the proper combination of voltages is caused to exist on the output leads 310—318 which interconnect the two layers 230, 231.

Figure 8:
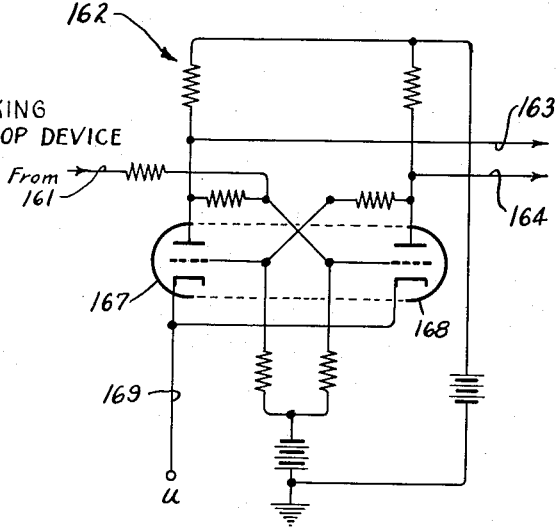
Fig. 8 is a schematic diagram of a flip-flop device.
Figure 11A:
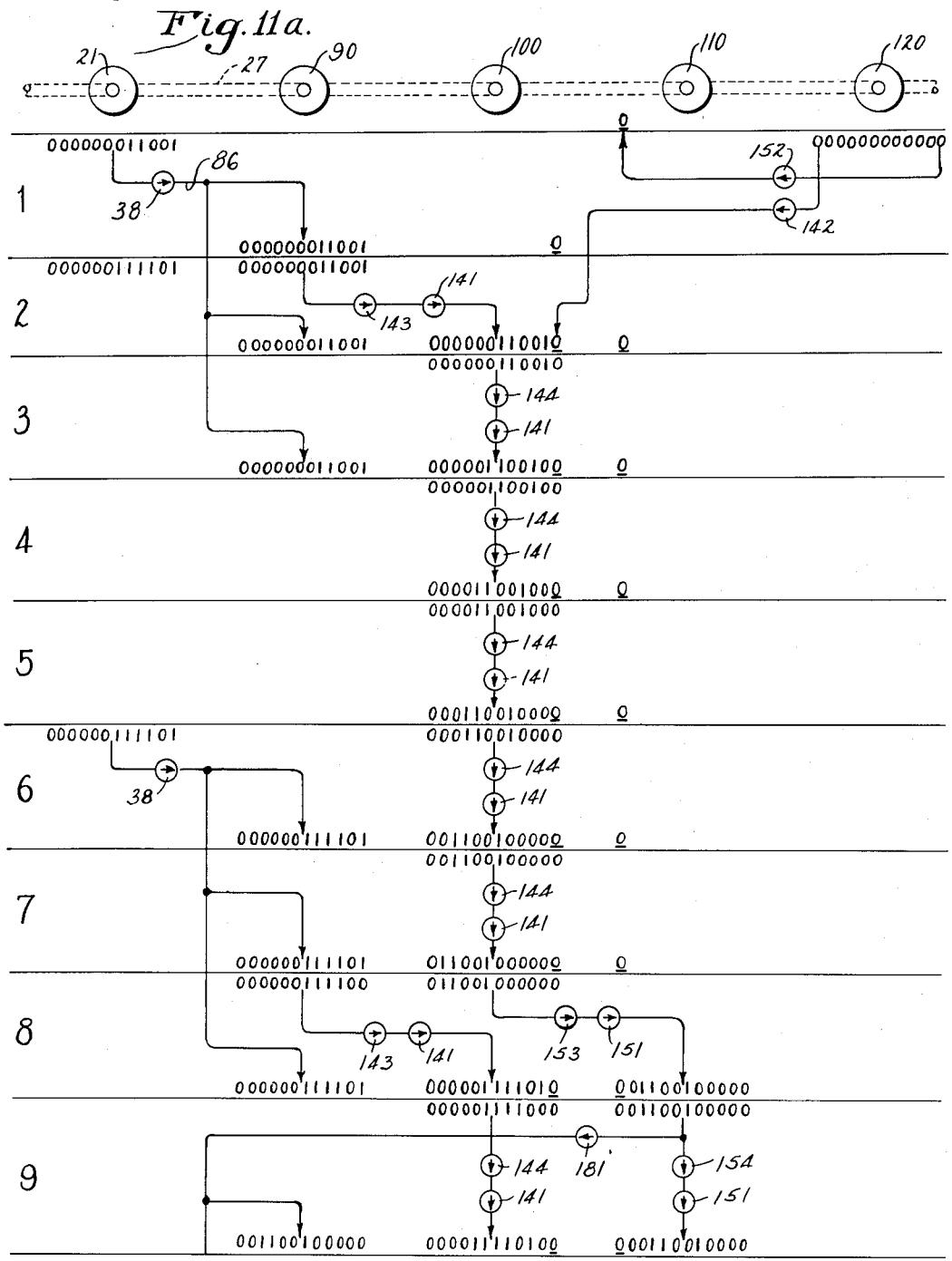

The flip-flop devices which are in actual control of the switches in the arithmetic unit are designated 320—328 and have specific circuits similar to that shown in Fig. 8. These do not change their condition immediately upon a change of condition in the leads 310—318 which supply them, but require unlocking. In the present circuit the switch-controlling flip-flops are all unlocked simultaneously at the very beginning of a step of computation. They are then free to respond to the associated conditioning flip-flop devices, such response taking place instantaneously to cause the immediate setting of the switches of the arithmetic unit.

Consideration may next be given to the means employed for simultaneously unlocking all of the flip-flop devices in the second layer 231. It will be observed in Fig. 2 that the switch 281 which is turned on by the flip-flop device 235 feeds into a lead 329, which is connected to the unlocking leads of all of the flip-flop devices in the second or output layer. As a result of the simultaneous unlocking at the beginning of each step it will be apparent that the switches in Fig. 1 having control terminals b, c, d, e, f, g, h, i, j, k, and n will be open-circuited or short-circuited in a predetermined manner to meet the needs of the ensuing computation step.

The components thus far described are capable of setting the switches in the arithmetic unit at the beginning of a step of computation. There are certain switches required for low order digit insertion into the multiplying disk which must be operated one digit interval in advance. To this end a control disk 340 is used having four teeth 341 which sweep past a head 342. The voltage induced therein is amplified in an amplifier 343 and applied to an output lead 344 which leads to a flip-flop device 345. The latter, which is of the type shown in Fig. 8, has output terminals p, q which are connected to correspondingly lettered terminals in the arithmetic unit of Fig. 1.

With the disk 340 properly offset one digit in the direction of rotation, the pulses appearing on the lead 344 may be made substantially one digit interval "early." Means are additionally provided, however, for increasing the timing accuracy by unlocking or triggering the flip-flop device 345 so that it is reversed and then restored to its original condition precisely one digit interval later. This is accomplished by connecting the unlocking lead 337 of the flip-flop device to two sources of pulses, spaced one digit interval apart, and timed by the same pulsing disks 253, 260 which control the remainder of the computer. In the present instance the unlocking lead 337 is supplied from lead 293 via an amplifier 338 and from lead 329 via an amplifier 339. In the operation of the foregoing circuit a pulse approximately one digit interval in length is applied to the device 345 from the disk 340 slightly more than one digit interval prior to the start of a separate computation. The device 345 is unlocked exactly one digit interval prior to the start of a step of computation. This causes it to "flip" into its alternate condition in which it remains temporarily even though the voltage on the input lead 344 reverts to its former value. At the beginning of a number interval one digit space later another unlocking pulse causes the device to "flop" back to its former state.

In similar fashion it is desirable to produce special pulses at the beginning of a step of computation and exactly one digit space later for what will be referred to as "high order digit insertion" in the dividing disk and "low order digit insertion" in the carry line of the summing circuit. This is accomplished in the present instance by a disk 350 having four teeth 351 and an associated pickup head 352. The output of the amplifier 353 connected thereto is fed into a lead 354. The latter is connected to the input of a flip-flop device 355 having output leads 356. This flip-flop device is unlocked at the beginning of a number interval by a signal from unlocking lead 334 via an amplifier 335 causing predetermined voltages to appear on terminals n, o. One digit interval after the beginning of the number interval, the flip-flop device is restored to its original condition by an unlocking pulse applied to lead 334 by an amplifier 336.

In practicing the invention, as will later appear, it is necessary for the arithmetic unit to read in successive steps the digits of the multiplier in order to determine whether the ensuing step shall involve adding of the multiplicand to the summation of the partial products or merely shifting of the multiplicand and the addition of zeros to the summation of the partial products. This reading is accomplished by successively shifting the multiplier to bring each of the digits thereof into the high order or active position in successive steps of computation. During the course of such reading it is necessary for the reading device, here the flip-flop device 161 (see Fig. 1) to be triggered synchronously with the passage of the digit in the highest order. To this end a disk 360 is provided having four teeth 361 thereon. Voltage induced in a head 362 is amplified by amplifier 363 and fed into a lead 364 connected to terminal r. With the teeth 361 properly phased the terminal r will provide an unlocking pulse at the one-quarter or three-quarter point of the digit interval prior to the beginning of a number interval.

In performing multiplication by the present invention the digits of the multiplier are utilized progressing from the high order to the low which is just the reverse of conventional computation. Furthermore, the multiplicand which is added to the summation of the successive partial products is shifted to the right one place relative to the binal point. Since the capacity of the machine is limited, the low order digit of such shifted multiplicand cannot be preserved and is discarded. In carrying out the invention, however, the remaining portion of the multiplicand is rounded off in accordance with what has been discarded. To accomplish this the discarded digits are "read" by a flip-flop circuit during the first digit interval in a step of computation so that a binary 1 may be added to the retained portion of the multiplicand in the event the discarded digit is a binary 1 and so that a binary 0 may be added to the multiplicand in the event that the discarded digit is a binary 0. The pulse for causing the discarded digit, and only the discarded digit, to be read is derived from a disk 365 having teeth 366 thereon. The latter sweep past a head 367 producing spaced pulses which are amplified in the amplifier 368 and applied to a line 369 connected to terminal s. The teeth 361 are phased so that a pulse is produced at the terminal s approximately one-quarter of a digit interval after the beginning of a step of computation. Such pulse may alternatively be produced at terminal s three-quarters of a digit interval after the beginning of a computation step by proper peripheral location of the pickup head in relation to the other heads. This pulse is applied to the digit-reading flip-flop 171 as will be covered in detail.

The remaining disk in Fig. 2 is employed to unlock the delay chain included in the summing circuit 130. The purpose of such a delay chain, as previously described, is to delay a carry digit from one order so that it may be included in the addition of the next higher order. It will suffice to say that for this purpose pulses are required at quarter-digit intervals. To produce such pulses a disk 370 is used having a plurality of closely spaced teeth 371, two per digit space. Cooperating with the teeth is a head 372 feeding into a peaking amplifier 373 having output leads 374, 375 respectively. The latter leads are connected to terminals designated $t$, $v$. The amplifier 373 preferably is similar to peaking amplifiers 263 and 264 mentioned above except that it includes a phase inverter in the amplifier section followed by two similar differentiating circuits. The negative voltage peaks from each of the differentiating circuits are removed to leave only positive peaks on output leads 374 and 375. Due to the action of the phase inverter the peak on the output lead 374 alternates with the peak on the output lead 375 so that between them they supply a total of four pulses per digit interval.

In summary, the functions of the disks in the control unit are as follows:

| Component | Description | Function |
| --- | --- | --- |
| (1) Clutch control disk 210 | 1 tooth | Times the energization of clutch 202. |
| (2) Initiating disk 253 | 4 teeth retarded 1 digit space. | Starts delay chain 233 1 digit interval in advance of number interval. |
| (3) Synchronizing disk 260 | 1 tooth per 2 digit spaces. | Successively unlocks delay chain 233. |
| (4) Zero inserter disk 340 | 4 teeth advanced 1 digit space. | Turns on zero inserter switch 142 during last digit interval. |
| (5) Zero inserter disk 350 | 4 teeth retarded 1 digit space. | Turns on zero inserter switch 152 during first digit interval. |
| (6) Reader control disk 360 | 4 teeth advanced 1 digit space. | Unlocks flip-flop 161 to read high order (active) digit of multiplier. |
| (7) Reader control disk 365 | 4 teeth retarded 1 digit space. | Unlocks flip-flop 171 to read low order (discarded) digit of multiplicand. |
| (8) Summing circuit control disk 370. | 2 teeth per digit space. | Successively unlocks delay line in summing circuit 130. |

MULTIPLICATION PROCEDURE

The present invention not only concerns the circuit arrangement which has been disclosed in the above sections and in Figs. 1 and 2 of the drawings, but also the procedure which is employed in the solution of a practical problem in multiplication employing such circuits. The procedure may be made clear by taking an example in which it will be assumed that the binary number 111101 constitutes the multiplicand and the binary number 011001 forms the multiplier. In performing a multiplication the multiplicand is acted upon by each digit of the multiplier in successive steps. In practicing the present invention the highest order digit of the multiplier is "active" in the first step and successively lower orders are active in the steps which follow. Where the active multiplier digit is a binary 1 the shifted multiplicand is added and where the multiplier digit is 0, 0's are added to form a new summation of partial products. In each step the multiplicand is shifted one place to the right relative to the binal point i. e., relative to the normal position on the disk on which the number is stored. This shifting takes place at each step regardless of whether the shifted multiplicand or merely binary 0's are added to the summation of the partial products previously obtained.

In accordance with another aspect of the invention each of the shifted multiplicands which are successively added in to form the product are rounded off to improve the accuracy of the product while keeping the product within the same number of orders as are in the multiplicand and multiplier. In accomplishing this each of the multiplicands, as an incident to shifting to the right, is divided into a retained portion and a discarded portion.

If the discarded digit in the multiplicand is a binary 0 then the used portion is left unchanged; however, if the discarded digit is a binary 1 then a binary 1 is added in with the retained portion of the multiplicand at such time as it may be added to the prior summation of the partial products. Thus, if it appears that the discarded portion is over one-half of a digit, then a binary 1 is added whereas if the discarded portion is less than one-half then it is ignored. The procedure employed in performing a multiplication using the assumed values of multiplicand and multiplier may be set forth from a purely mathematical standpoint as follows:

| | | |
| --- | --- | --- |
| (1) | 111101 | (Multiplicand.) |
| (2) | 011001 | (Multiplier.) |
| (3) | 000000 | } 1st partial product, discarded digit read and a binary 1 transferred into totalizer. |
| (4) | 011110 1 | |
| (5) | —— 1 | |
| (6) | 011111 | } 1st summation of partial products, discarded digit read—no special action. |
| (7) | 001111 0 | |
| (8) | 101110 | } 2nd summation of partial products. |
| (9) | 000000 | |
| (10) | 101110 | } 3rd summation of partial products. |
| (11) | 000000 | |
| (12) | 101110 | } 4th summation of partial products, discarded digit read and a binary 1 transferred into totalizer. |
| (13) | 000001 1 | |
| (14) | ——1 | |
| (15) | 110000 | Last summation of partial products. |

NOTE.—Underlining denotes binary 0's which have been filled in to occupy spaces vacated by shift.

In the above tabulation (1) is the multiplicand and (2) the multiplier. The multiplicand is multiplied by the left-hand or high order digit of the multiplier. Since this is 0 a series of 0's is written. This is the first partial product indicated at (3). The multiplicand is then shifted one place to the right and multiplied by the second digit of the multiplier. Since such digit is a binary 1 the shifted multiplicand is set down at (4). The vacated space is filled in with a binary 0 from a separate source as indicated by the underlining. The surplus binary 1 at the right is read and since it is a 1, causes a binary 1 to be inserted into the summing circuit and added as indicated at (5). Adding (3), (4) and (5) gives (6) which is the first summation of partial products. The multiplicant is then multiplied by the third digit of the multiplier which is a binary 1. To do this it is necessary to set down the shifted multiplicand as shown at (7). The surplus digit is 0 this time and therefore causes a 0 to be added in the carry line of the summing circuit. Since this is the standard operation of the summing circuit, the surplus 0 can be considered to be discarded. In step (8), (6) and (7) are added to form a second summation of partial products. In (9) the multiplicand is multiplied by the fourth digit of the multiplier which is a binary 0. Zeros are added to the preceding summation to form (10), the third summation of partial products. Similarly the multiplicand is multiplied by the fifth digit of the multiplier which is a binary 0 as indicated at (11). These are added to the preceding summation to form the fourth summation of partial products at (12). Finally, the shifted multiplicand is multiplied by the lowest order digit of the multiplier which is a binary 1. The surplus binary 1 is not merely discarded; instead, a binary 1 is added to the lowest order as indicated at (13) to form the rounded off member (14). This is the last summation of partial products and includes the significant digits of the answer to the problem in multiplication. The binal point must be placed however. Referring to the multiplier and multiplicand, it will be apparent that the answer is comprised of 11 digits and that the binal point must be considered as located to the right 5 places. The actual answer with perfect accuracy may be found by employing the conventional procedure for binary multiplication to be 10111110101. The first six places of the actual answer are 101111. Comparing this with the answer obtained in the above steps 1–15, namely, 110000, it will be noted that the latter is accurate to 1 in the lowest order (the sixth) to which computation was restricted.

READING OF MULTIPLIER DIGIT

As stated above it is necessary that the active multiplier digit be read so that the shifted multiplicand may be either added to the partial product or not depending upon whether the multiplier digit is a binary 1 or a binary 0. For convenience a portion of the circuit of Fig. 1 which accomplishes such reading and which controls the flow of the multiplicand into the summing circuit has been set forth in Fig. 9. The multiplier is recorded on the multiplier disk 100 and during a step of calculation is shifted to the left one place and re-recorded in another quadrant on the disk, the shifting resulting from the fact that the recording head is offset to the left. The entire shifted multiplier is applied to the input of the two-condition or flip-flop device 161 which serves as a reader. In the present embodiment the active multiplier digit is the digit of highest order. The device 161 is so constructed as to be insensitive to the input except when it is momentarily unlocked, whereupon the output voltage will remain in a stable condition corresponding to the polarity of the input voltage at the instant of unlocking.

As previously stated, the control disk 369 (Fig. 2) is so phased as to apply an unlocking pulse to the flip-flop device 161 at the one-quarter or three-quarter point of the digit interval where the voltage is maximum. After unlocking the polarity corresponds to the digit which has been read.

In order to cause the shifted multiplicand or 0's to be added during a subsequent step a synchronized delay or storage device is employed. In the present embodiment such delay device takes the form of a flip-flop device 162. This is unlocked at the very beginning of a number interval so that the setting of the switches 165, 166 connected to the output thereof is dependent upon the value of the digit which has been read.

ROUNDING OFF OF MUTLIPLICAND

In order to keep within the capacity of the machine when using very large numbers it is desirable for the significant figures of the answer to be the same in number as the significant figures of the numbers which are multiplied together. This is contrasted with products normally obtained which have a number of places equal to the sum of the places in the data. This is accomplished in the present device by a rounding off process in which the multplicand is shifted to the right in successive steps and by discarding the right-hand digit each time a shift takes place. Where the digit which is discarded is a binary 0 this introduces no error but where the discarded digit is a binary 1, repeated discarding will result in an error. Consequently, I employ means in the present device for reading the low order digit which is discarded from the shifted multiplicand as an incident to adding the same so that where the discarded digit is a binary 1, a binary 1 may be inserted into the summing circuit.

The means for accomplishing this as set forth in Fig. 1 includes flip-flop devices 171, 172 which act in a manner quite analogous to the flip-flop devices 161, 162 previously discussed. Assuming that switch 170 is closed the entire multiplicand will appear at the input of the reading flip-flop device 171. This, however, has no effect on this flip-flop device unless the device is unlocked by a pulse derived from control disk 365 (Fig. 2) which is so phased as to cause the unlocking impulse to occur either at the quarter point or at the three-quarter point in the low order or discarded digit space in the multiplicand. Thus, the output of the flip-flop device 171 is of one polarity or the other depending upon whether the discarded digit is a 0 or a 1. A very short time later at the beginning of the number interval flip-flop device 172 is unlocked so that its output is polarized according to whether the discarded digit was a 1 or a 0. If the discarded digit is a 0 switch 175 is closed thus completing the circuit between the zero generating disk 120 and the low order digit inserter lead 135 running to the summing circuit. If, on the other hand, the discarded digit is a binary 1 then switch 175 is turned off and 176 on. The latter is connected in series with an inverter 177 of conventional design so that a binary 1 is added to the sum.

In practicing the invention means are further provided for preventing the insertion of a rounding-off binary 1 under conditions where the multiplicand is merely shifted rather than being both shifted and added to the partial product. It will be recalled that this shifting takes place when the active digit of the multiplier is a binary 0. This function is accomplished by the switch 178 which is inserted in series with the output lead of flip-flop device 172. The switch 178 is controlled by lead 163 which is the same lead that turns the switch 165 off to prevent the shifted multiplicand from being routed to the summing circuit.

It is of interest to note at this point that the switch 178 when off causes the switches 175 and 176 to respond in exactly the same manner as they would in the case where the low order digit being read is a binary 0. This will be made clear by referring to the circuit diagram of the switch which is set forth in Fig. 4. Here it will be noted that under off conditions a high positive voltage is applied at the control terminal and consequently the controlling triode 72 becomes heavily conducting. As a result the switching triode 68 (where this is the side of the circuit being used) is biased to cut off irrespective of the voltage applied to the input terminal of the switch. Thus, the voltage at the terminal 70 remains highly positive under all input conditions and the switch may be considered as off. By choosing the output terminal of flip-flop 172 which is relatively negative when a binary 0 is stored, the voltage at the terminal 70 will also be highly positive when the switch 178 is on and a binary 0 is read by flip-flop 171. Thus if the switch 178 is off, a binary 0 is inserted in the lowest order via the inserter lead 135, even though the low order digit passed through switch 170, and read by the flip-flop device 171, is a binary 1.

It will be apparent that the round-off binary 1 is added only to the partial product and is not carried along in the shifted multiplicand. When the binary digit which is discarded and read is a binary 0, switch 175 remains on and only 0's are passed through the low order digit inserter lead 135. This procedure is inherently accurate since the number which is rounded off, namely, the shifted multiplicand, is not itself the result of repeated rounding off.

DATA FLOW DIAGRAM FOR THE PROCESS OF MULTIPLICATION

The manner in which the present computer is utilized to effect data flow is the solution of a problem in construction which will be made clear by reference to Figs. 11, 11a, 11b and 11c which together form a data flow diagram. This diagram not only shows the active data flow paths in each step for the process, but also the binary digits which are read from and recorded on the various disks. Across the top of the diagram are listed the elements between which data flow takes place including the disks 21, 90, 100, 110 and 120. The successive steps are listed along the left-hand edge of the diagram. In each step a binary number is read from one of the disks and transferred to another either unchanged or suitably transformed. Possible transformations include shifting to the right or left relative to the binal point and the addition of one binary number to another. The time consumed in each of the steps is the same and is referred to as a number interval. It is equal to the time required for the disks to rotate through one number space, this, in the present instance, being one-quarter of a revolution.

Each number space or quadrant will be considered to have 12 digit spaces since this is about the minimum number which may be employed for a simple practical example. It will be understood that in a commercial embodiment 25 or more digit spaces per number may be used without departing from the invention.

It will be assumed at the outset that the multiplier 000000011001 is recorded in the form of magnetic couples at the periphery of the storage disk 21 in the first quadrant thereof. It will be assumed further that the multiplicand 000000111100 is similarly recorded in the second quadrant.

*Step 1*

The motor 28 is started and the shaft 27 advanced to a point where a tooth 211 on the clutch control disk 210 arrives at the head 212. This will cause operation of the "B" clutch 202 to start movement of the control tape 200 in synchronism with the disks. During the first number interval the multiplier is read from the disk 21 and passes through the switch 38 onto the bus 86. The switch 38 is closed and it is assumed that the control terminal *k* thereof is being energized by the control unit. From the bus the multiplier is fed through the amplifier 95 and recorded simultaneously in three quadrants of the temporary storage disk 90. In this step the zero generating disk 120 is in operation and the switch 152 closes during the first digit interval to record a binary 0 in the last digit space of the "preceding" quadrant of disk 110. Also, during this step, switch 142 closes so that a binary 0 is recorded in the low order digit space in the first quadrant of disk 100. This function is repeated for each step so that a fill-in zero is automatically entered in the lowest order of each of the quadrants of disk 100 and in the highest order position in each of the quadrants of disk 110. In the steps which follow this path will not be repeated but the binary 0's which result will be listed and underlined throughout.

*Step 2*

The multiplicand is available at this time on disk 21. However it is not used at present since it is desirable to shift the multiplier several places to the left to move the significant digits to the higher orders and thus make use of the full place capacity of the computer. In preparing for this shifting process the multiplier is transferred through switches 143, 141 to disk 100. Since the recording head of this disk is shifted one digit space, this causes the multiplier to be doubled.

*Step 3*

In this step the multiplier is read off of disk 100 and recorded back on this disk in another quadrant resulting in an additional shift to the left.

*Steps 4 and 5*

This shift is repeated two more times in the same manner as in step 3.

*Step 6*

The multiplier on disk 100 is again shifted. In addition the multiplicand which is now available on disk 21 is read off and recorded on the temporary storage disk 90 in three quadrants.

*Step 7*

The multiplier is re-recorded on disk 100 thereby producing an additional shift to the left.

*Step 8*

In this step the shifted multiplier is recorded on disk 110 via switches 153, 151. At the same time the multiplicand is transferred via switches 143, 141 to disk 100. This produces a shift one digit space to the left. Note that the multiplier is shifted to the right in being recorded on disk 110 due to the fact that the recording head thereon is shifted one digit space. This serves no useful purpose but is a necessary incident to transferring the number to disk 110.

*Step 9*

The multiplicand is shifted one more place to the left by re-recording it on disk 100. The multiplier is read off of disk 110 and recorded on disk 90. It is also recorded back on disk 110 in shifted position but this has no significance as far as the problem is concerned.

*Steps 10–13*

In each of these steps the multiplicand is shifted to the left one place.

*Step 14*

Both the multiplicand and multiplier have now been shifted the desired amounts to the left and we are now ready to start actual multiplication. The shifted multiplicand is recorded on disk 110 and the shifted multiplier is read out of disk 90 and recorded on disk 100. Disk 90 is employed to store the partial products which will be formed. In order to make certain that the disk 90 is clear, zeros are recorded on it from the zero generator disk 120 via switch 180.

*Step 15*

In this step the high order digit of the properly shifted multiplier is read to determine the switch settings for the first step in the actual multiplication process. In addition, the multiplier is re-recorded on disk 100 shifted one more place to the left. This shift moves the second highest multiplier digit to the high order space so that it can be read in the following step to determine the switch setting for the second multiplication step. During this step it is necessary to re-record the multiplicand on disk 110 which introduces an additional shift to the right. The multiplicand as it exists at the end of this step is in proper form for solving the problem.

*Step 16*

This step starts the actual process of multiplication since the first partial product is formed in this step. As stated above, there are two alternatives in each of the successive steps of multiplication. If the active digit of the multiplier is zero then merely zeroes are added to the partial product. On the other hand, if the active digit of the multiplier is a binary 1, then the shifted multiplicand is added to the partial product. Means are provided therefore for reading the active digit of the multiplier and for causing either switch 165 or 166 to close depending on whether it is a 1 or a 0. This reading is accomplished using flip-flop device 161 in Fig. 1. Flip-flop 161 is actually subjected to the entire multiplier since the switch 160 which feeds it is closed over the entire number interval. However, this flip-flop device is unlocked for response only during the last digit of a number space.

More specifically the flip-flop device is unlocked for a very short time interval at either the one-quarter point or the three-quarter point of the last digit, such unlocking occurring through terminal *r* which, as mentioned in connection with Fig. 2, is controlled by the specially phased control disk 360. After this short unlocking pulse is removed the output leads will retain the polarity characteristic of the digit which was read. A very short time later at the beginning of the ensuing number interval the flip-flop device 162 is unlocked to respond to the then existing condition of the leading flip-flop device 161 and the corresponding voltage appears at the output for the duration of the number interval. Where a 0 has been read the switch 166 is closed and the switch 165 is opened so that a string of 0's flow from the zero generating disk to the summing circuit, and where the high order or active digit of the multiplier is 1, the positions of the switches are reversed and the shifted multiplicand is fed to the summing circuit from the disk 110 and via the lead 132.

Since the high order or left-hand digit of the multiplier read in step 15 was 0, switch 166 is turned on for step 16 so that 0's are fed to the summing circuit. Since, at this point, the summation of the partial product is 0, 0's are fed from the disk 90 to the summing circuit via lead 131. Since both of the main input signals consist merely of binary 0's the output of the summing circuit will also be made up of binary 0's which are passed through switch 137 and are recorded in three positions on the storage disk 90. Referring back to the above tabulation of steps in the multiplication process this corresponds to line 3. During this step also the multiplier is re-recorded on disk 100 shifted one place to the left. The multiplicand is also re-recorded on disk 110 shifted one place to the right.

As a further occurrence during this step the left-hand or active digit of the multiplier is read. This is a binary 1 indicating that in the next step the multiplicand, shifted one place to the right, should be added to the 0's on disk 90 which correspond to the summation of the partial products.

Step 17

Since the active digit of the multiplier read in the previous step was a binary 1, switch 165 is on and switch 166 is off during this step. Consequently this provides a path for the shifted multiplicand via lead 132 and to the summing circuit. The same multiplicand is also fed back onto the disk 110 in readiness for the ensuing step. It is, of course, shifted one more place to the right during this re-recording process. While this is going on a binary number consisting merely of a string of 0's flows from the storage disk via lead 131 into the summing circuit. The sum is recorded in three positions on disk 90. Also during this step the multiplier is re-recorded on disk 100 shifted one place to the left and the high order digit is read by the flip-flop device 161 to determine whether the shifted multiplicand or merely 0's will be added in the following step.

Step 18

This is similar to step 17. Since the active or high order digit of the multiplier was a binary 1 in the previous step, the shifted multiplicand from disk 110 is added to the summation of partial products which was stored temporarily on disk 90. The sum is recorded in three positions on disk 90. During this step the active digit of the multiplier is read by the flip-flop device 161 and found to be zero.

Step 19

Because of the fact that a 0 was read in the preceding step the shifted multiplicand is not added in this step but rather a series of zeros are added which pass from the zero generating disk 120 via switch 166. The sum, therefore, remains unchanged and is again recorded on disk 90. During this step the active or high order multiplier digit is read and found to be again 0 which causes the addition of 0's in the following step.

Step 20

This step is similar to step 19 in that 0's are added to the partial products rather than the shifted multiplicand. In this step the multiplicand is re-recorded on disk 110 shifted one place, just as in steps 15 through 19. Each time that this re-recording process takes places, the number is also fed through switch 170 and the low order digit remembered by flip-flop 171 which is unlocked by lead S. At the start of the next number time, flip-flop 172 is unlocked to allow it to assume a condition corresponding to flip-flop 171.

This action also occurred in steps 15 through 19, but in each of these steps the setting of flip-flop 172 had no effect, either because it was set to a condition corresponding to a 0 or because switch 178 was turned off. The diagram was therefore simplified by omitting this path where it has no effect on the computation.

Step 21

In this step the shifted multiplicand is supplied to the summing circuit via switch 165 and lead 132, just as in steps 17 and 18. However, since switch 178 is turned on along with switch 165 and since in this case flip-flop 172 stores a 1, switch 176 will be turned on and switch 175 turned off. This introduces a binary 1 into the carry input as the low order digit and therefore the answer out of the summing circuit is 1 larger than the sum of 00101101000 and 000000011110. In effect then the number which has been added to the summation of previous partial products is the rounded off multiplicand.

Steps 22–26

These steps are the same in principle as the steps discussed immediately above. Preceding each step the active multiplier digit is a 0 and therefore 0's are added to the summation of the partial products from disk 90.

Step 27

This is the final step of the multiplication process. In response to the 0 read as the high order multiplier digit in step 26, 0's are added to the summation of the partial products from disk 90. However, since this is the last step, it is not necessary to re-record the multiplier or multiplicand. The final numerical result as set forth in Fig. 11d, step 27 is 001011111011. This corresponds to the actual answer 10111110101 to nine places of accuracy and is referred to as the "rounded-off product" of the original multiplicand and multiplier. It will be seen that the error between the final numerical result and the actual answer is extremely small, only a binary 1. It will be apparent to one skilled in the art that such error is not due to any inherent inaccuracy of apparatus or procedure, but is due only to the fact that the exemplary computer has purposely been made of limited capacity for purposes of economy and in order to bring out the principles of operation more simply. It will be apparent to one skilled in the art that the invention described herein is not limited to 12 places but would include computers with storage elements expanded to accommodate as many places as desired. In view of the fact that a binary equivalent has three and a fraction binal places per decimal place, it is particularly noteworthy that such expansion does not require a proportionate increase in vacuum tubes and associated components. In addition, the rounding-off procedure enables maximum accuracy to be preserved even where the place capacity of a given computer is relatively limited. In order to locate the binal point the shifts of the multiplier and multiplicand prior to starting multiplication must be considered. It must also be remembered that digits were effectively dropped from the product each time that a digit was shifted out of the multiplicand.

Since the full multiplicand (or zeros in the case where the highest order digit of the multiplier is 0) is used as the first partial product (depending upon the high order multiplier digit), the number of digits dropped from the full product will be one less than the number of multiplier digits, or in this example 11 digits. Consequently if we considered the binal point at the extreme right of the multiplicand and multiplier, the binal point in the product would be 11 places to the right and the answer obtained by the computer would have to be multiplied by $2^{11}$ to obtain the true product.

This multiplication by $2^{11}$, which is merely a shift in the binal system, may take place before or after the regular multiplication process. To illustrate this, let us consider the example shown in Fig. 11a–d, and assume that the multiplicand and multiplier are shown in steps 1 and 2 are the true numbers with the binal point located at the extreme right. Before beginning the actual multiplication process, the multiplicand is shifted a net total of 4 places or multiplied by $2^4$. (Compare steps 2 and 16.) The multiplier is shifted a net total of 6 places or multiplied by $2^6$. (Compare steps 1 and 15.) Consequently to obtain the true product of the numbers in steps 1 and 2, the product as indicated in step 27 must be shifted once more to make a total of 11 shifts. This shifting may be done immediately by means of disk 100, or the number may be left as is and the true location of the binal point remembered by the person preparing the control tape 200. In a complete computer embodying this multiplication system, the next process to be performed with this product will usually determine the best way to treat the binal point location.

In the following claims the term "concurrence device" shall be understood to include a device exemplified in the present application by switch 178 for causing an act to be preformed (for example, the insertion of a binary 1 into the totalizer for roundoff purposes) only when the signals applied thereto satisfy both of the stated conditions. The term "storage disk" shall be understood to include a short term storage device in which data are recorded in a closed loop. A "source of binary 1's" shall mean any device which is capable upon actuation of producing a signal representative of binary 1.

I claim as my invention:

1. In a multiplying computer of the digital type in which the two binary digits are represented by plus-minus and minus-plus voltage couples respectively and in which computation takes place in a series of steps each characterized by the flowing of a binary number digit by digit from one storage device to another, multiplier shifting means for shifting a binary number constituting the multiplier to the left one order for each step of computation so that each digit thereof is successively advanced into an active position of highest order, a totalizer circuit, multiplicand shifting means for shifting the binary number forming the multiplicand successively to the right one order for each step of computation thereby producing a retained portion and a discarded low order digit, multiplier reading means for reading the high order digit of the multiplier, a source of binary 0's means including an electronic switch operated by said multiplier reading means for connecting the totalizer either (1) to the multiplicand shifting means for receiving the shifted multiplicand or (2) to the source of binary 0's depending upon whether the active digit of the multiplier is a binary 1 or a binary 0, means for reading said discarded digit, and a concurrence device connected to both of said reading means, said concurrence device being so arranged that the reading of binary 1 from both of said reading means causes insertion of a low order binary 1 into the totalizer while leaving the shifted multiplicand unaffected for further shifting.

2. In a computer of the digital type in which the two binary digits are represented by plus-minus and minus-plus voltage couples respectively and in which computation takes place in a series of steps each characterized by the flowing of a binary number digit by digit from one storage device to another, the combination comprising means for dividing a binary number into a retained portion and a discarded low order digit, a first two-condition device of the type in which the output voltage comes into correspondence with the input voltage and remains stably in such condition upon momentary unlocking of the same, means for applying said binary number to the input of said two-condition device, means for momentarily unlocking said two-condition device in synchronism with the arrival of said discarded digit and at an instant during the digit interval when the voltage is maximum so that the two-condition device assumes a first stable condition when the discarded binary digit is a binary 1 and a second condition when the discarded digit is a binary 0, means including a second two-condition device which assumes a first stable condition whenever the retained portion of said binary number is to be utilized in the ensuing step of computation, and a concurrence device coupled to said two-condition devices, said concurrence device having means for adding a binary 1 to said retained portion whenever said two-condition devices both occupy their first stable condition.

3. In a multiplying computer of the digital type in which the two binary digits are represented by plus-minus and minus-plus voltage couples respectively and in which computation takes place in a series of steps each characterized by the flowing of a binary number digit by digit from one storage device to another, means for producing a series of couples representative of a multiplier and multiplicand, a totalizer for forming a series of couples representative of a product, means for shifting the multiplicand one place to the right during each step of computation to form a retained portion and a discarded portion, means for transferring the retained portion to the totalizer once for each occurrence of a binary 1 in the multiplier, and means for rounding off the shifted multiplicands upon transferring the same to the totalizer, said rounding-off means having a reading device for determining whether the discarded portion is a binary 1 or a binary 0, and means including a concurrence device responsive to (1) transfer of a shifted multiplicand to the totalizer and (2) the discarded digit being binary 1 for transferring a binary 1 to the totalizer in the ensuing step of computation.

4. In a multiplying computer of the digital type in which the two binary digits are represented by plus-minus and minus-plus voltage couples respectively and in which computation takes place in a series of steps each characterized by the flowing of a binary number digit by digit from one storage device to another, means for producing a series of couples representative of a multiplier, means including a storage device for producing a series of couples representative of a multiplicand, a totalizer for forming a series of couples representative of a product, means for advancing the multiplicand received from the storage device one digit interval during each step of computation to form a retained portion and a discarded portion and for transferring the retained portion back to the storage device, means for transferring the retained portion to the totalizer once for each occurrence of a binary 1 in the multiplier, first reading means conditioned for response when said discarded portion is a binary 1, second reading means conditioned for response upon transfer of said retained portion to the totalizer, and concurrence means coupled to said first and second reading means for transferring a binary 1 to the totalizer upon simultaneous response of the latter to provide roundoff in the ensuing step of computation.

5. In a multiplying computer of the digital type in which the two binary digits are represented by plus-minus and minus-plus voltage couples respectively and in which computation takes place in a series of steps each characterized by the flowing of a binary number digit by digit from one storage device to another either unchanged or suitably transformed, the combination of means including a multiplier disk having recorded thereon a series of couples representative of a multiplier, means including a multiplicand disk having recorded thereon a series of couples representative of a multiplicand, a totalizer coupled to said multiplicand disk and having a storage disk connected to the output thereof for storing a series of couples representative of the partial product resulting from a given step of computation, means for reading the successive multiplier digits in successive steps starting with the digit of highest order, means for relatively shifting the binary number forming the multiplicand successively one place to the right for each step of computation, a source of binary 0's, means including a switch for coupling said multiplicand disk and said source of 0's to said totalizer, and switch control means for (1) causing said switch to couple said totalizer to said multiplicand disk when the multiplier digit in a given step is binary 1 and (2) causing said switch to couple said totalizer to said source of 0's when the multiplier digit is binary 0.

6. In a multiplying computer of the digital type in which the two binary digits are represented by plus-minus and minus-plus couples respectively and in which computation takes place in a series of steps each characterized by the flowing of a binary number digit by digit from one storage device to another, the combination of means for a sequentially producing a series of couples representative of a multiplier, means including a cyclical recording medium for sequentially producing a series of couples representative of a multiplicand, a totalizer including a summing circuit and storage device for establishing a series of couples representative of a product, means for reading the digits of the multiplier in successive steps of computation starting with the digit of highest order, said cyclical recording medium having recording and pickup heads relatively offset for shifting the couples representative of the multiplicand one binal place to the right relative to the partial product in the totalizer during each successive step of computation and means including an electronic switch controlled by said reading means for transferring said multiplicand digit by digit to said totalizer once following each reading of a binary 1 in said multiplier.

7. In a multiplying computer of the binary digital type the combination of means for reading the successive digits of a binary number constituting the multiplier from high order to low during successive steps of computation, a totalizer, means for separating the binary number forming the multiplicand into a retained portion and a discarded low order digit during successive steps of computation, means including an electronic switch for feeding the retained portion of the multiplicand into the totalizer when the multiplier digit is a binary 1, means for reading the discarded low order digit of the multiplicand, and means including a concurrence device coupled to both of said reading means as well as a source of binary 1's for inserting a binary 1 into the totalizer whenever the multiplier digit and the discarded digit from the shifted multiplicand are both binary 1 while leaving the shifted multiplicand unaffected for further shifting.

8. In a multiplying computer of the digital type in which the two binary digits are represented by plus-minus and minus-plus voltage couples respectively and in which computation takes place in a series of steps each characterized by the flowing of a binary number digit by digit from one storage device to another either unchanged or suitably transformed, the combination of means for reading the digits constituting the multiplier starting with the digit of highest order and reading one digit for each succeeding step of computation, a totalizer, means for relatively shifting the binary number from the multiplicand successively to the right one order for each step of computation thereby producing a retained portion and a discarded low order digit, means including an electronic switch for feeding the shifted multiplicand into the totalizer whenever the read multiplier digit is a binary 1, means for reading the discarded digit, and means including a concurrence device coupled to both of said reading means as well as a source of binary 1's for inserting a binary 1 into the totalizer for addition with the digits of lowest order whenever the multiplier digit and the discarded digit from the shifted multiplicand are both binary 1.

9. In a computer of the digital type in which the two binary digits are represented by plus-minus and minus-plus voltage couples respectively and in which computation takes place in a series of steps each characterized by the flowing of a binary number digit by digit from one storage device to another either unchanged or suitably transformed, the sub-combination comprising a reading flip-flop device of the type in which the output voltage assumes a condition of correspondence with the input voltage upon momentarily unlocking of the flip-flop device and remains stably in the assumed condition, a source of digits forming a binary number coupled to the input of said reading flip-flop device, means for unlocking said flip-flop device to cause it to respond to a digit of predetermined order in said number and at an instant when the voltage is maximum so that the flip-flop device assumes a stable condition corresponding to the digit of predetermined order, a second flip-flop device having its input connected to respond to the output voltage of the reading flip-flop device, means including switches for establishing predetermined paths for the flow of binary numbers during a given step of computation, means for unlocking said second flip-flop device for causing operation of said switches, and an electronic input switch interposed between said source and said reading flip-flop device, said input switch being of the type in which a steady state voltage of given polarity exists at the the output under the "off" condition so that the reading flip-flop device upon unlocking thereof under said "off" condition assumes a state corresponding to the reading of a given binary digit.

10. In a multiplying computer of the binary digital type in which computation takes place in a series of steps each characterized by the flowing of a binary number in the form of electrical impulses digit by digit from one storage device to another either unchanged or suitably transformed, the combination of means for relatively shifting a binary number constituting the multiplier to the left one order for each step of computation so that each digit thereof is successively advanced into active multiplying position, a totalizer, means for relatively shifting the binary number forming the multiplicand successively to the right one order for each step of computation thereby producing a retained portion and a discarded low order digit, means for reading the digit in the multiplying position of the multiplier, means including an electronic switch for feeding the shifted multiplicand into the totalizer whenever the read multiplier digit is a binary 1, means for reading the discarded digit from the shifted multiplicand, and means including a concurrence device and a source of binary 1's for inserting a binary 1 into the totalizer whenever the multiplier digit and the discarded digit are both binary 1 while leaving the shifted multiplicand unaffected for further shifting in subsequent steps.

11. In a multiplying computer of the binary digital type in which the digits are represented by characteristic electrical impulses, and in which computation takes place in a series of steps, the combination of means including a cyclically operating storage medium for storing in sequence the digits of a binary multiplier, means cooperating with such medium for shifting said binary multiplier to the left one order for each step of computation so that each digit thereof is successively advanced into an active multiplying position, a totalizer, means including a second cyclically operating storage medium for storing in sequence the digits of a binary multiplicand, means cooperating with said second storage medium for shifting the binary number forming the multiplicand successively to the right one order for each step of computation thereby producing a retained portion and a discarded low order digit, means for reading the digit in the multiplying position of the multiplier, means including an electronic switch for feeding the shifted multiplicand into the totalizer whenever the read multiplier digit is a binary 1, means for reading the discarded digit from the shifted multiplicand, and means including a concurrence device and a source of binary 1's for inserting a binary 1 into the totalizer whenever the multiplier digit and the discarded digit are both binary 1 while leaving the shifted multiplicand unaffected for further shifting in subsequent steps.

12. In a mulitplying computer of the binary digital type in which the two binary digits are represented by plus-minus and minus-plus voltage couples, the combination comprising a multiplier disk and a multiplicand disk, means for driving the discs in synchronism with one another, the multiplier disk having a series of couples representing a multiplier recorded thereon, said multiplicand disk having a series of couples representing a multiplicand recorded thereon, said multiplier disk having recording and pickup heads thereon and having a loop circuit interconnecting the same, the multiplier recording head being retarded one digit space relative to the pickup head so that the multiplier is progressively shifted to the left during successive steps of computation so that the digits thereon are successively advanced into an active multiplying digit space, said multiplicand disk having recording and pickup heads thereon and having a loop circuit interconnecting the same, the multiplicand recording head being advanced one digit space relative to the pickup head so that the multiplicand is progressively shifted to the right during successive steps of computation so that the digits thereon of lowest order are successively discarded, a totalizer, switches for connecting the pickup head on said multiplicand disk to said totalizer, means responsive to the couple in the active digit space on the multiplier disk for operating said switch means so that the shifted multiplicand is transferred into the totalizer whenever the digit in the active digit space is a binary 1.

13. In a multiplying computer of the binary digital type, the combination of means for reading the successive digits of a binary number constituting the multiplier from high order to low during successive steps of computation, a totalizer, means for separating the binary number forming the multiplicand into a retained portion and a discarded low-order digit during successive steps of computation, means including an electronic switch for feeding the retained portion of the multiplicand into the totalizer whenever the multiplier digit in the active reading position is a binary 1, means for reading the discarded low-order digit of the multiplicand, and means including a concurrence device and a source of binary 1's for inserting a binary 1 into the totalizer during any step in which the digit in the active reading position of the multiplier and the discarded digit from the multiplicand are both binary 1, while leaving the retained portion of the multiplicand unaffected for use in the succeeding step.

14. In a multiplying computer of the digital type in which computation takes place in a series of steps each characterized by the flowing of a binary number digit by digit from one storage device to another, means including a cyclical short term storage device having a loop circuit for shifting a binary number constituting the multiplier to the left one order for each step of computation so that each digit thereof is successively advanced into an active position of highest order, a totalizer circuit, multiplicand shifting means including a cyclical short term storage device having a loop circuit for successively shifting the binary number forming the multiplicand to the right one order for each step of computation thereby producing a retained portion and a discarded low order digit, multiplier reading means for reading the high order digit of the multiplier, a source of binary 0's, means including an electronic switch operated by said multiplier reading means for connecting the totalizer either (1) to the multiplicand shifting means for receiving the shifted multiplicand or (2) to the source of binary 0's depending upon whether the active digit of the multiplier is a binary 1 or a binary 0, means for reading said discarded digit, and a concurrence device connected to both of said reading means, said concurrence device being so arranged that the reading of binary 1 from both of said reading means causes insertion of a low order binary 1 into the totalizer while leaving the shifted multiplicand unaffected for further shifting.

References Cited in the file of this patent

UNITED STATES PATENTS

| | | |
|---|---|---|
| 2,404,047 | Flory et al. | July 16, 1946 |
| 2,409,689 | Morton et al. | Oct. 22, 1946 |
| 2,445,215 | Flory | July 13, 1948 |

FOREIGN PATENTS

| | | |
|---|---|---|
| 578,041 | Great Britain | June 13, 1946 |